United States Patent
Sagae et al.

(10) Patent No.: US 8,611,939 B2
(45) Date of Patent: Dec. 17, 2013

(54) DELIVERY APPARATUS, TERMINAL APPARATUS, SYSTEM AND METHOD

(75) Inventors: Yuta Sagae, Kawasaki (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 391 days.

(21) Appl. No.: 13/062,358

(22) PCT Filed: Aug. 12, 2009

(86) PCT No.: PCT/JP2009/064264
§ 371 (c)(1),
(2), (4) Date: Jun. 21, 2011

(87) PCT Pub. No.: WO2010/026857
PCT Pub. Date: Mar. 11, 2010

(65) Prior Publication Data
US 2011/0244904 A1    Oct. 6, 2011

(30) Foreign Application Priority Data

Sep. 5, 2008  (JP) ................................ 2008-228988

(51) Int. Cl.
*H04W 4/00* (2009.01)
(52) U.S. Cl.
USPC ........... 455/507; 455/132; 455/149; 455/272; 455/403; 455/500; 455/561
(58) Field of Classification Search
USPC ....................................................... 455/507
See application file for complete search history.

(56) References Cited

U.S. PATENT DOCUMENTS

| | | | |
|---|---|---|---|
| 5,301,359 A * | 4/1994 | Van den Heuvel et al. ... | 455/524 |
| 5,553,315 A * | 9/1996 | Sobti et al. .................... | 455/509 |
| 6,198,921 B1 * | 3/2001 | Youssefzadeh et al. ...... | 455/428 |
| 6,366,582 B1 * | 4/2002 | Nishikado et al. ............ | 370/401 |
| 6,411,620 B1 * | 6/2002 | Takase et al. ................. | 370/390 |
| 6,522,641 B1 * | 2/2003 | Siu et al. ....................... | 370/338 |
| 6,532,417 B2 * | 3/2003 | Hatano ......................... | 701/420 |
| 6,546,537 B1 * | 4/2003 | Komoda ....................... | 716/120 |
| 6,553,355 B1 * | 4/2003 | Arnoux et al. ................. | 706/13 |
| 6,680,915 B1 * | 1/2004 | Park et al. ..................... | 370/254 |

(Continued)

OTHER PUBLICATIONS

International Search Report issued Nov. 17, 2009 in PCT/JP09/064264 filed Aug. 12, 2009.

(Continued)

*Primary Examiner* — Hai V Nguyen
(74) *Attorney, Agent, or Firm* — Oblon, Spivak, McClelland, Maier & Neustadt, L.L.P.

(57) ABSTRACT

A delivery apparatus for delivering to multiple areas, wherein one or more radio communication systems are available in each of the areas, includes a storage unit configured to store system information for each of the areas, the system information being required to connect to the available radio communication systems, a detection unit configured to detect a second delivery apparatus for delivering to a portion of the delivery areas of the delivery station and a delivery unit configured to deliver system information for each of the areas as control information, the system information being required to connect to a radio communication system available in the area. If the detection unit detects the second delivery apparatus, the delivery unit delivers system information as the control information, the system information in the storage unit excluding a portion of the system information required to connect to a radio communication system available in an area where the second delivery apparatus is responsible for delivering the control information.

15 Claims, 19 Drawing Sheets

(56) References Cited

U.S. PATENT DOCUMENTS

| | | | |
|---|---|---|---|
| 6,795,070 B1* | 9/2004 | Laurent-Chatenet et al. | 345/423 |
| 6,825,839 B2* | 11/2004 | Huang et al. | 345/423 |
| 6,856,208 B2* | 2/2005 | Lee et al. | 331/55 |
| 6,999,629 B1* | 2/2006 | Lechat et al. | 382/240 |
| 7,003,169 B1* | 2/2006 | Lechat et al. | 382/240 |
| 7,046,669 B1* | 5/2006 | Mauger et al. | 370/393 |
| 7,054,634 B2* | 5/2006 | Watanabe et al. | 455/440 |
| 7,170,852 B1* | 1/2007 | Adler | 370/223 |
| 7,185,305 B1* | 2/2007 | Rodman | 716/127 |
| 7,222,169 B2* | 5/2007 | Koshimizu et al. | 709/224 |
| 7,272,608 B2* | 9/2007 | Udeshi et al. | 1/1 |
| 7,274,945 B2* | 9/2007 | Backes et al. | 455/510 |
| 7,285,487 B2* | 10/2007 | DeHon et al. | 438/618 |
| 7,295,552 B1* | 11/2007 | Kadambi et al. | 370/392 |
| 7,346,219 B2* | 3/2008 | Demaret et al. | 382/248 |
| 7,512,179 B2* | 3/2009 | Sanson et al. | 375/240.12 |
| 7,551,634 B2* | 6/2009 | Nabae | 370/408 |
| 7,596,152 B2* | 9/2009 | Yarvis et al. | 370/503 |
| 7,657,234 B2* | 2/2010 | Qu et al. | 455/72 |
| 7,676,236 B2* | 3/2010 | Nanda et al. | 455/509 |
| 7,711,008 B2* | 5/2010 | Jones et al. | 370/503 |
| 7,733,869 B2* | 6/2010 | Fischer et al. | 370/395.1 |
| 7,733,891 B2* | 6/2010 | Reynolds et al. | 370/412 |
| 7,738,401 B2* | 6/2010 | Elias et al. | 370/254 |
| 7,783,360 B2* | 8/2010 | Zdravkovic et al. | 607/62 |
| 7,792,099 B2* | 9/2010 | Yasukawa et al. | 370/386 |
| 7,793,104 B2* | 9/2010 | Zheng et al. | 713/171 |
| 7,801,857 B2* | 9/2010 | Betts et al. | 707/628 |
| 7,818,018 B2* | 10/2010 | Nanda et al. | 455/509 |
| 7,920,826 B2* | 4/2011 | Kim et al. | 455/16 |
| 7,924,745 B2* | 4/2011 | Hirano et al. | 370/254 |
| 7,933,278 B2* | 4/2011 | Lee | 370/400 |
| 7,936,681 B2* | 5/2011 | Gong et al. | 370/238 |
| 7,944,817 B1* | 5/2011 | Sylvain | 370/228 |
| 7,958,271 B2* | 6/2011 | Zou et al. | 709/249 |
| 7,974,220 B2* | 7/2011 | Elias et al. | 370/254 |
| 7,978,725 B2* | 7/2011 | Gong et al. | 370/445 |
| 7,990,374 B2* | 8/2011 | Itkowitz et al. | 345/419 |
| 8,014,336 B2* | 9/2011 | Bertinelli et al. | 370/315 |
| 8,019,341 B2* | 9/2011 | Falk et al. | 455/434 |
| 8,023,521 B2* | 9/2011 | Woo et al. | 370/412 |
| 8,031,738 B2* | 10/2011 | Kuo | 370/439 |
| 8,036,330 B2* | 10/2011 | Nelson | 375/356 |
| 8,037,305 B2* | 10/2011 | Rahman et al. | 713/168 |
| 8,046,020 B2* | 10/2011 | Lee et al. | 455/522 |
| 8,081,582 B2* | 12/2011 | Saleh et al. | 370/254 |
| 8,081,618 B2* | 12/2011 | Tseng | 370/349 |
| 8,094,149 B2* | 1/2012 | Tian et al. | 345/419 |
| 8,144,621 B2* | 3/2012 | Fujita et al. | 370/254 |
| 8,160,044 B2* | 4/2012 | Tseng | 370/342 |
| 8,205,182 B1* | 6/2012 | Zlatanovici et al. | 716/125 |
| 8,233,489 B2* | 7/2012 | Welin et al. | 370/395.32 |
| 8,249,578 B2* | 8/2012 | Yagyu et al. | 455/420 |
| 8,286,111 B2* | 10/2012 | Chandra et al. | 716/110 |
| 8,294,568 B2* | 10/2012 | Barrett | 340/539.11 |
| 8,295,859 B1* | 10/2012 | Yarkan et al. | 455/456.6 |
| 8,311,539 B2* | 11/2012 | Luo et al. | 455/434 |
| 8,325,706 B2* | 12/2012 | Pacella | 370/351 |
| 8,396,001 B2* | 3/2013 | Jung et al. | 370/252 |
| 8,400,974 B2* | 3/2013 | Mueck et al. | 370/329 |
| 8,422,940 B2* | 4/2013 | Oyman et al. | 455/7 |
| 8,433,252 B2* | 4/2013 | Nibe | 455/69 |
| 8,462,783 B2* | 6/2013 | Dong et al. | 370/392 |
| 2002/0094813 A1* | 7/2002 | Koshimizu et al. | 455/436 |
| 2002/0094817 A1* | 7/2002 | Rune et al. | 455/450 |
| 2004/0137931 A1* | 7/2004 | Sarkar et al. | 455/522 |
| 2004/0202146 A1* | 10/2004 | Lee | 370/350 |
| 2005/0192037 A1* | 9/2005 | Nanda et al. | 455/509 |
| 2005/0239443 A1* | 10/2005 | Watanabe et al. | 455/414.1 |
| 2007/0250713 A1* | 10/2007 | Rahman et al. | 713/171 |
| 2008/0020792 A1* | 1/2008 | Falk et al. | 455/517 |
| 2008/0025208 A1* | 1/2008 | Chan | 370/217 |
| 2008/0062984 A1* | 3/2008 | Emeott et al. | 370/392 |
| 2008/0130492 A1* | 6/2008 | Kuo | 370/226 |
| 2008/0144507 A1* | 6/2008 | Tseng | 370/235 |
| 2008/0144593 A1* | 6/2008 | Tseng | 370/342 |
| 2008/0159457 A1* | 7/2008 | Nelson | 375/356 |
| 2008/0200197 A1* | 8/2008 | Gessner et al. | 455/517 |
| 2008/0253340 A1* | 10/2008 | Hirano et al. | 370/338 |
| 2008/0285526 A1* | 11/2008 | Gorokhov et al. | 370/338 |
| 2009/0034485 A1* | 2/2009 | Tseng | 370/335 |
| 2009/0059855 A1* | 3/2009 | Nanda et al. | 370/329 |
| 2009/0210710 A1* | 8/2009 | Zheng et al. | 713/171 |
| 2009/0241104 A1* | 9/2009 | Amiga et al. | 717/174 |
| 2009/0316613 A1* | 12/2009 | Tseng | 370/310 |
| 2009/0325506 A1* | 12/2009 | Nibe | 455/67.13 |
| 2010/0265891 A1* | 10/2010 | Belcea | 370/328 |
| 2011/0188378 A1* | 8/2011 | Collins et al. | 370/236 |
| 2011/0223952 A1* | 9/2011 | Nanda et al. | 455/509 |

OTHER PUBLICATIONS

"The $E^2R$ II Flexible Spectrum Management (FSM) Framework and Cognitive Pilot Channel (CPC) Concept—Technical and Business Analysis and Recommendations," End-To-End Reconfigurability II ($E^2R$ II) White Paper, pp. 1-52, (Nov. 2007).

Sallent, O., et al., "Decentralized Spectrum and Radio Resource Management Enabled by an On-demand Cognitive Pilot Channel," European Wireless, pp. 1-7, (2007).

Perez-Romero, J., et al., "A Novel On-Demand Cognitive Pilot Channel enabling Dynamic Spectrum Allocation," IEEE, pp. 46-54, (2007).

Martigne, P., et al., "An alternative concept to scanning process for cognitive radio systems: technical and regulatory issues," $16^{TH}$ IST Mobile and Wireless Communications Summit, total 5 pages, (Jul. 2007).

* cited by examiner

FIG.6

| DELIVERY STATION INDEX (BS Index) | NUMBER OF MESHES (No. Mesh)(N) | MESH #0 INFORMATION (Mesh#0 Mssg.) | MESH #(N-1) INFORMATION (Mesh#(N-1) Mssg.) |
|---|---|---|---|
| 0 | 1...1 | | |

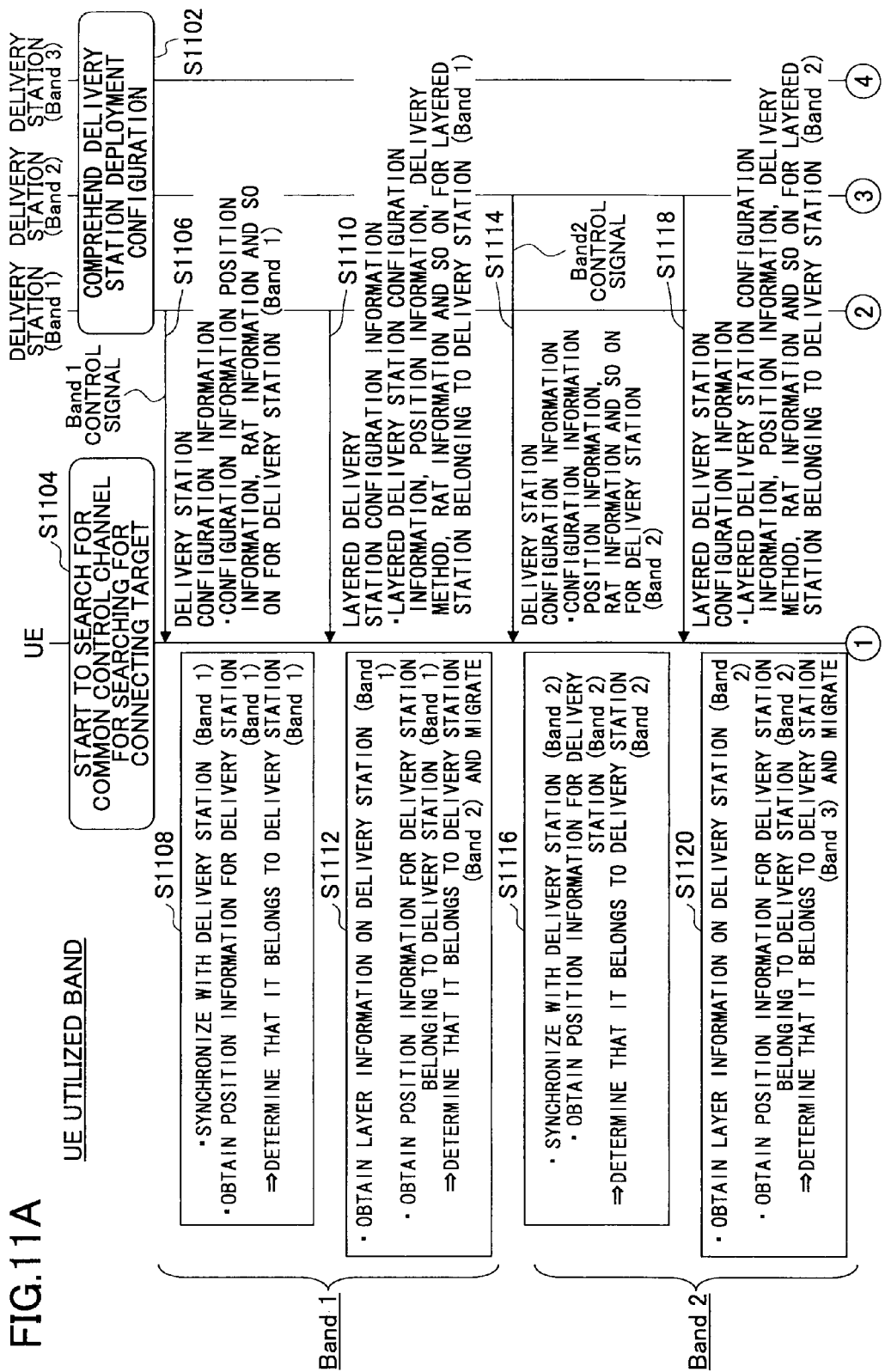

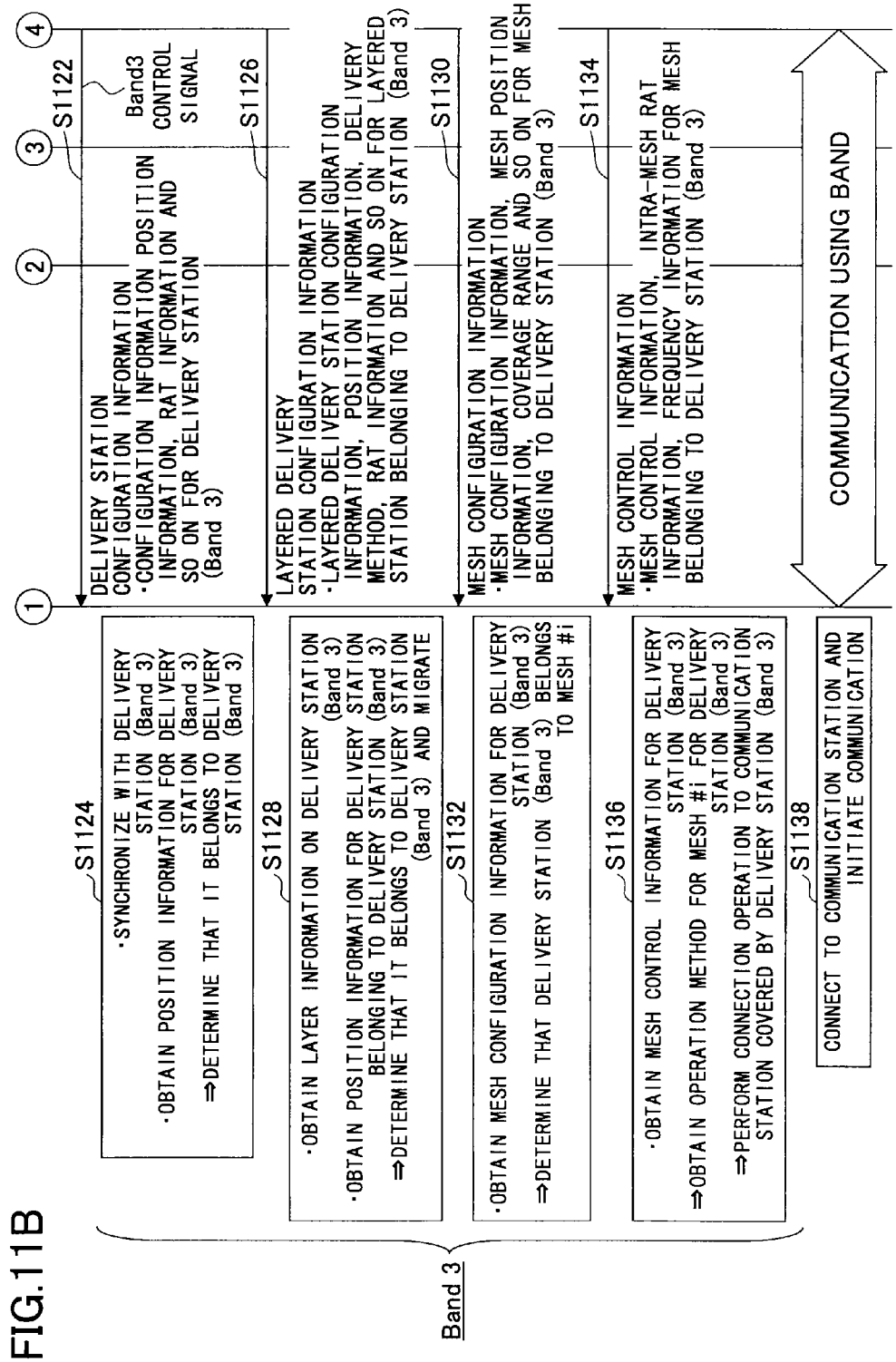

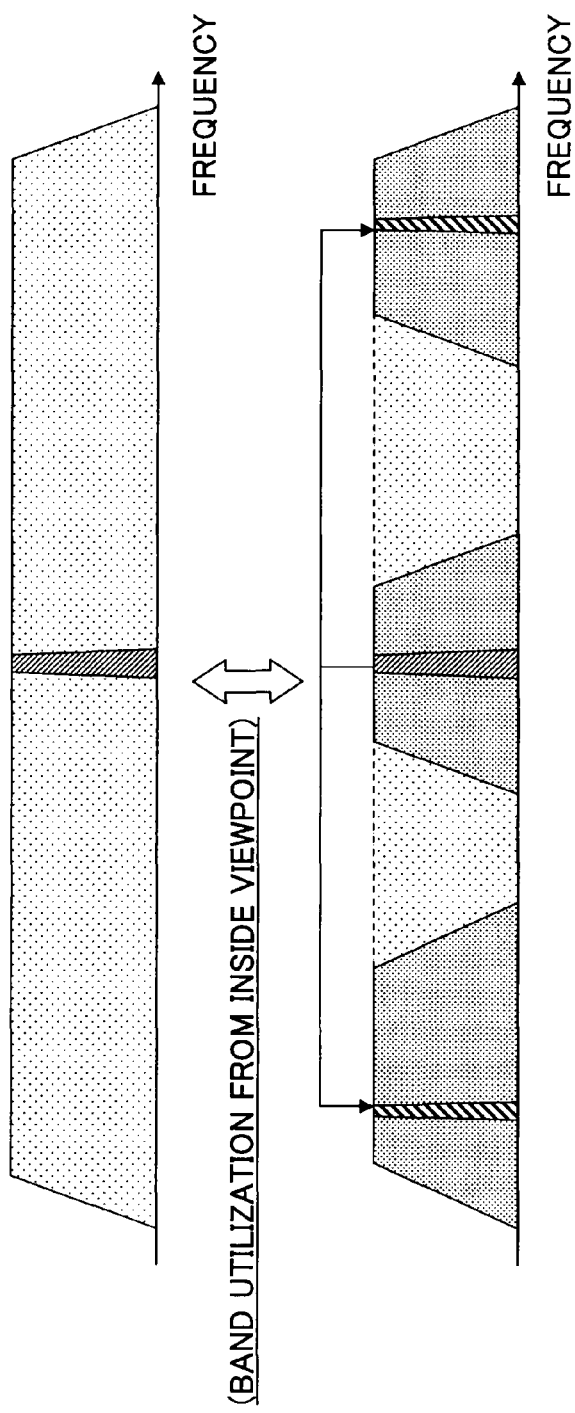

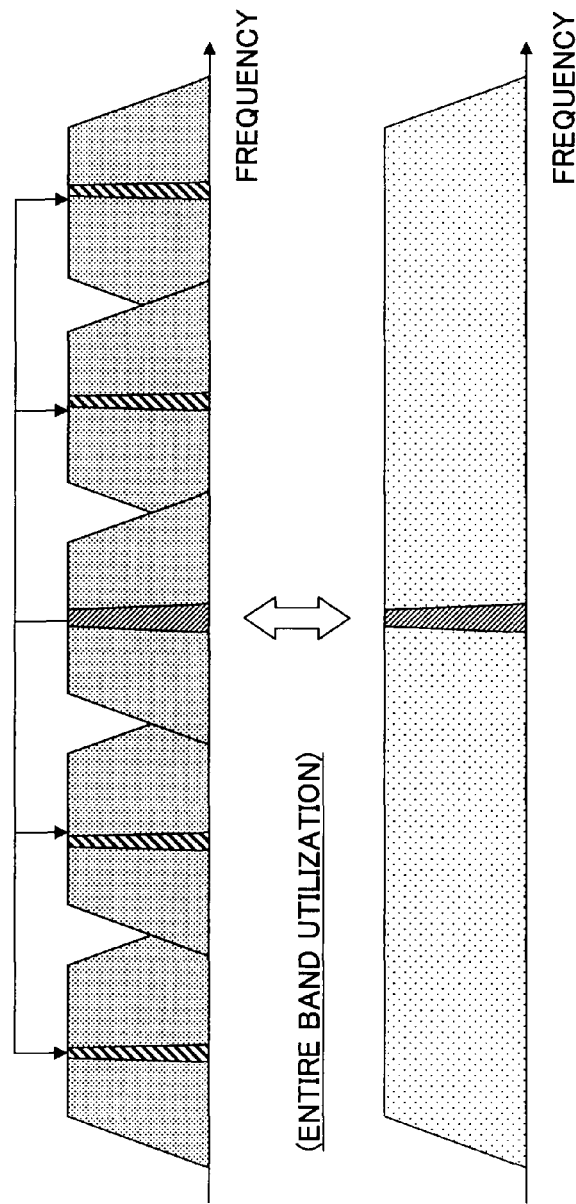

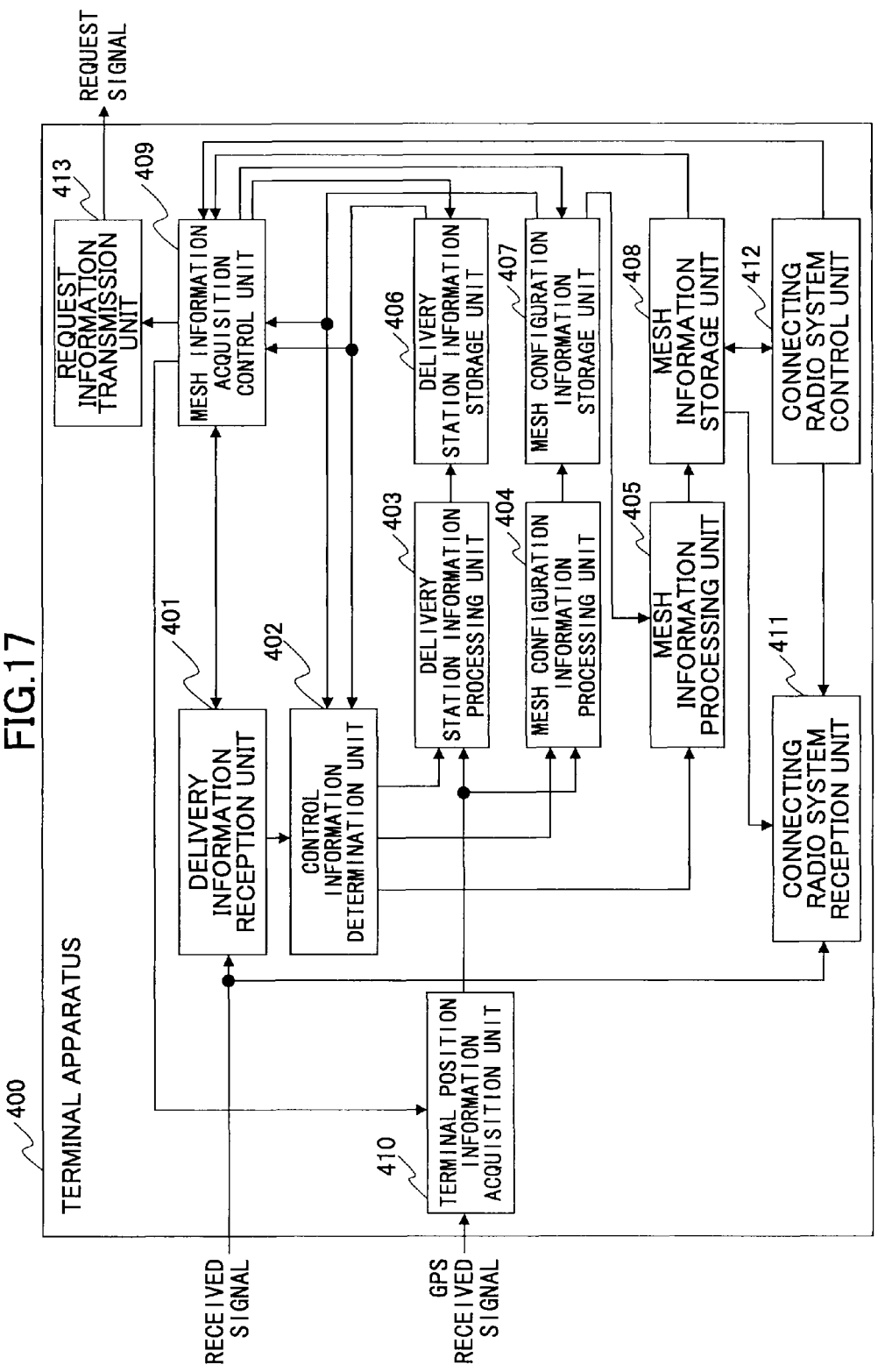

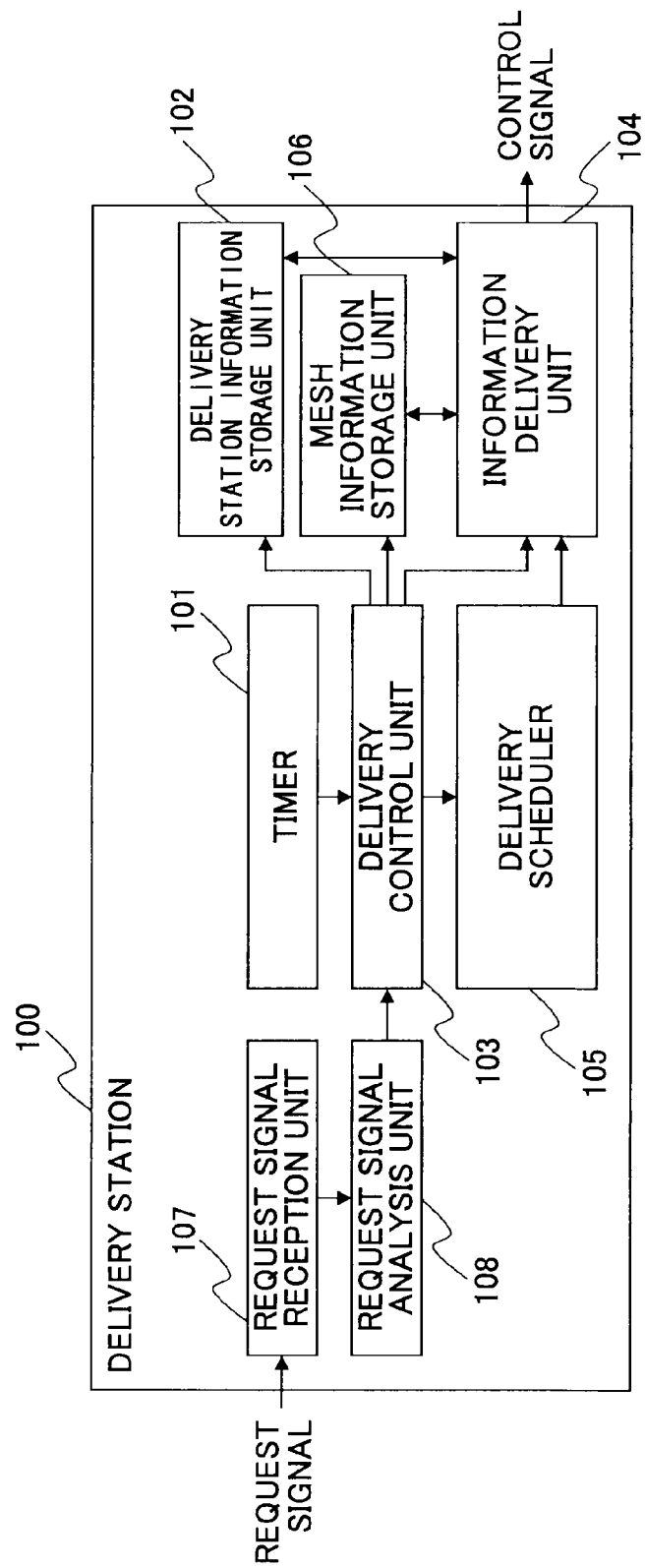

DELIVERY APPARATUS, TERMINAL APPARATUS, SYSTEM AND METHOD

TECHNICAL FIELD

The present invention relates to a radio communication system and more particularly relates to a delivery apparatus, a terminal apparatus, a system and a method.

BACKGROUND ART

Although a broadband is required for faster communications, it is difficult to reserve a common broad frequency band available around the world due to a variety of operating radio communication systems. For this reason, there is being discussed an approach for using several frequency bands to assign priority of frequency utilization to each of the frequency bands and allowing several radio communication systems to utilize a common frequency band. Also, since it is hard to reserve such a common frequency band available around the world, a terminal apparatus must selectively use frequency bands among several frequency band candidates in different countries, and accordingly some components are needed for identifying radio communication systems presently operated in the terminal apparatus residing area depending on areas where the terminal apparatus is used. However, a large amount of consumed power and/or a long identification time period are required for the terminal apparatus to identify available radio bands from a very broad band where many radio communication systems may be operated. Also, in environments of shared frequencies, a higher priority assigned radio communication system (referred to as a primary system hereinafter) and a lower priority assigned radio communication system (referred to as a subsidiary system hereinafter) use the same frequency band for communication while avoiding interference to the primary system. This technique includes some techniques for calculating the amount of interference to the primary system based on propagation loss between the primary system and the subsidiary system and some techniques for controlling transmit power of the subsidiary system depending on the calculated amount of interference. In addition, in consideration of the traffic amount during communication by the primary system, an allowable amount of interference may be determined, and the transmit power of the subsidiary system may be controlled. For example, the allowable amount of interference may be set to be larger in a time period of a less traffic amount in the primary system, and the subsidiary system can be controlled to operate at a higher level of maximum transmit power than a time period of a larger traffic amount in the primary system.

In the case where this type of technique is used, frequency utilization schemes are dynamically changed, and thus a terminal apparatus must always utilize functions of identifying available frequency bands and radio communication systems.

A cognitive pilot channel (CPC) for broadcasting information items such as frequency bands and radio schemes available in individual radio communication systems operated in each area is proposed to handle the above-mentioned dynamic change in the frequency utilization schemes. Applying the CPC enables the terminal apparatus to do without scanning fundamental parameter information on connectable radio communication systems. Also, in the case where the CPC is applied, some parameters of the radio communication systems can be changed by changing the above-mentioned control information. In addition, the CPC can be applied without modification of the terminal apparatus itself.

Thus, this technique can decrease cost of the terminal apparatus and address change in the parameters for the radio communication systems, which can improve the frequency utilization efficiency.

In the technique, a coverage area of a base station apparatus is divided into multiple areas. The divided areas may be referred to as meshes. In the areas covered by the base station apparatus, a control signal is broadcast. Also, the base station apparatus indicates a utilization scheme of radio resources such as the fundamental parameter information of the radio communication systems for each mesh several times. The same information may be broadcast. Also, there are two types of control signal delivery methods, that is, a broadcast type delivery method and an on-demand type delivery method. In the broadcast type delivery method, a base station apparatus periodically broadcasts control information corresponding to meshes within its coverage area. In the on-demand type delivery method, in response to a delivery request from a terminal apparatus, a base station apparatus delivers control information corresponding to a mesh where the requesting terminal apparatus resides. Also, a hierarchical advertiser CPC has been proposed. In the hierarchical advertiser CPC, several delivery stations and means are utilized, and a delivered control signal is partially separated.

RELATED ART DOCUMENT

Non-Patent Document

Non-patent document 1: J. Perez-Romero, at al., "A Novel On-Demand Cognitive Pilot Channel enabling Dynamic Spectrum Allocation", IEEE Dyspan 2007.

SUMMARY OF INVENTION

Problem to be Solved by the Invention

Even in areas where radio operators deploy respective radio communication systems, if a common control signal cannot be received, communication using the radio communication systems cannot be made. For this reason, it is anticipated that many delivery apparatuses are deployed to ensure coverage. In this case, it is envisaged that an area (mesh) belonging to a certain delivery apparatus may also belong to other several delivery apparatuses, and the common control signal would be broadcast to that area from the several delivery apparatuses. It is not preferable that the same information is delivered from the several delivery apparatuses from the viewpoint of frequency utilization efficiency. Thus, a method for dividing system information included in the delivered common control signal and delivering the divided system information by using several delivery apparatuses and delivery means is proposed.

However, a delivery apparatus and a terminal apparatus corresponding to the case where a network consists of several delivery apparatuses have not been discussed. Also, the system information delivered by the delivery apparatus has not been discussed. Further, the control information transmitted in the case where a terminal apparatus migrates between the delivery apparatuses has not been discussed.

Thus, a delivery apparatus, a terminal apparatus, a system and a method according to the present invention address at least one of the above-mentioned problems. One object of the present invention is to provide a delivery apparatus, a terminal apparatus, a system and a method that can realize layered delivery apparatuses for delivering the common control signal.

Another object of the present invention is to provide a delivery apparatus, a terminal apparatus, a system and a method that can configure a network with several delivery apparatuses using different delivery methods.

Means for Solving the Problem

In order to overcome the above-mentioned problem, there is provided a delivery apparatus for delivering to multiple areas wherein one or more radio communication systems are available in each of the areas, comprising: a storage unit configured to store system information for each of the areas, the system information being required to connect to the available radio communication systems; a detection unit configured to detect a second delivery apparatus for delivering to a portion of the delivery areas of the delivery station; and a delivery unit configured to deliver system information for each of the areas as control information, the system information being required to connect to a radio communication system available in the area, wherein if the detection unit detects the second delivery apparatus, the delivery unit delivers system information as the control information, the system information in the storage unit excluding a portion of the system information required to connect to a radio communication system available in an area where the second delivery apparatus is responsible for delivering the control information.

In addition, there is provided a terminal apparatus for receiving control information delivered by a delivery apparatus wherein upon detecting a second delivery apparatus for delivering to a portion of multiple delivery areas of the delivery apparatus, the delivery station delivers system information as control information, the system information excluding a portion of the system information required to connect to a radio communication system available in an area where the second delivery apparatus is responsible for delivering the control information together with information indicative of the second delivery apparatus, comprising: a reception unit configured to receive the control information from the second delivery apparatus based on the information indicative of the second delivery apparatus in the control information transmitted from the delivery apparatus; a determination unit configured to determine whether the terminal apparatus belongs to the area where the second delivery apparatus is responsible for delivering the control information based on the control information received at the reception unit from the second delivery apparatus; and a connection unit configured to, if the determination unit determines that the terminal apparatus belongs to the delivery area of the second delivery apparatus, connect to the second delivery apparatus.

In addition, there is provided a system comprising: a delivery apparatus for delivering to multiple areas; and a terminal apparatus for receiving information delivered by the delivery apparatus, wherein one or more radio communication systems are available in each of the areas, the delivery apparatus comprising: a storage unit configured to store system information for each of the areas, the system information being required to connect to the available radio communication systems; a detection unit configured to detect a second delivery apparatus for delivering to a portion of the delivery areas of the delivery station; and a delivery unit configured to deliver system information for each of the areas as control information, the system information being required to connect to a radio communication system available in the area, wherein if the detection unit detects the second delivery apparatus, the delivery unit delivers system information as the control information, the system information in the storage unit excluding a portion of the system information required to connect to a radio communication system available in an area where the second delivery apparatus is responsible for delivering the control information, and the terminal apparatus comprising: a reception unit configured to receive the control information from the second delivery apparatus based on the information indicative of the second delivery apparatus in the control information transmitted from the delivery apparatus; a determination unit configured to determine whether the terminal apparatus belongs to the area where the second delivery apparatus is responsible for delivering the control information based on the control information received at the reception unit from the second delivery apparatus; and a connection unit configured to, if the determination unit determines that the terminal apparatus belongs to the delivery area of the second delivery apparatus, connect to the second delivery apparatus.

Furthermore, there is provided a method in a system including a delivery apparatus for delivering to multiple areas and a terminal apparatus for receiving information delivered by the delivery apparatus, wherein one or more radio communication systems are available in each of the areas, the method comprising: at the delivery apparatus, detecting a second delivery apparatus for delivering to a portion of the delivery areas of the delivery station; and delivering system information for each of the areas as control information, the system information being required to connect to a radio communication system available in the area, wherein if the detecting step comprises detecting the second delivery apparatus, the delivering step comprises delivering system information as the control information, the system information in a storage unit excluding a portion of the system information required to connect to a radio communication system available in an area where the second delivery apparatus is responsible for delivering the control information, and the method further comprising: at the terminal apparatus, receiving the control information from the second delivery apparatus based on the information indicative of the second delivery apparatus in the control information transmitted from the delivery apparatus; determining whether the terminal apparatus belongs to the area where the second delivery apparatus is responsible for delivering the control information based on the control information received from the second delivery apparatus; and if it is determined that the terminal apparatus belongs to the delivery area of the second delivery apparatus, connecting to the second delivery apparatus.

Advantage of the Invention

According to the disclosed delivery apparatus, terminal apparatus, system and method, it is possible to realize layered delivery apparatuses for delivering a common control signal.

BRIEF DESCRIPTION OF DRAWINGS

FIG. 6 is a schematic diagram illustrating an exemplary mesh configuration information signal delivered from a delivery station according to one embodiment;

FIG. 11A is a flow diagram illustrating operations of a terminal apparatus and a delivery station according to one embodiment;

FIG. 11B is a flow diagram illustrating operations of a terminal apparatus and a delivery station according to one embodiment;

FIG. 12 is a schematic diagram illustrating exemplary band utilization method and control signal utilization method in a delivery apparatus according to one embodiment;

FIG. 13 is a schematic diagram illustrating exemplary band utilization method and control signal utilization method in a delivery apparatus according to one embodiment;

FIG. 17 is a second functional block diagram illustrating a terminal apparatus according to one embodiment; and FIG. 18 is a third functional block diagram illustrating a delivery apparatus according to one embodiment.

DETAILED DESCRIPTION OF EMBODIMENTS

Figure 1:
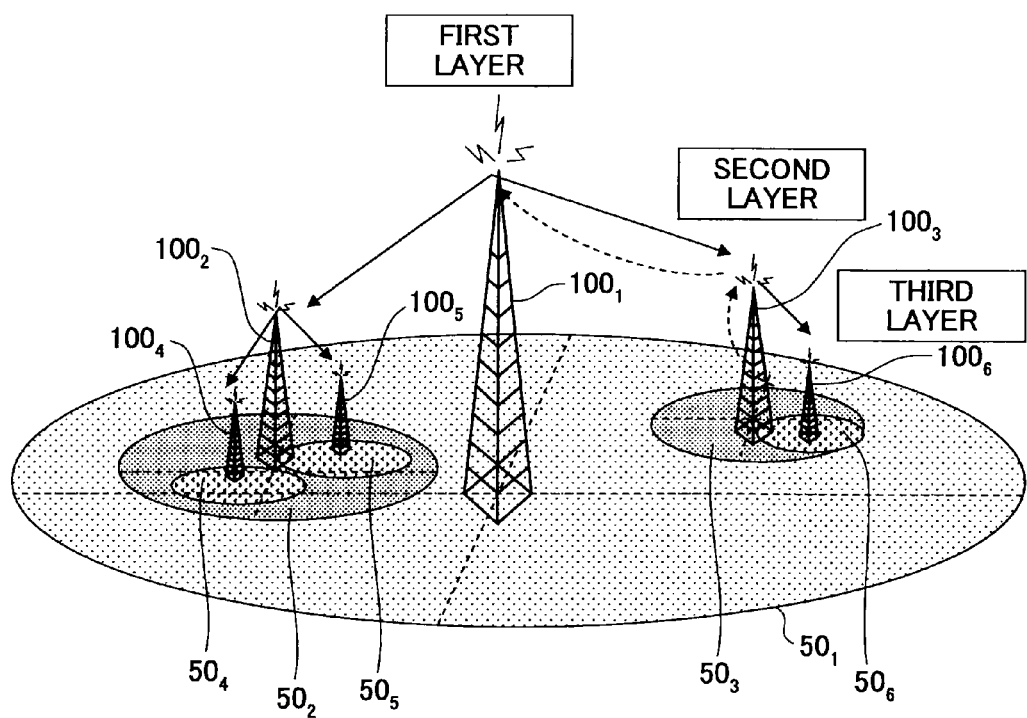
FIG. 1 is conceptual diagram illustrating layered delivery stations according to one embodiment.

Embodiments of the present invention are described below with reference to the drawings. Throughout the drawings for illustrating the embodiments, the same reference symbols are used for entities having the same functions, and descriptions thereof are not repeated.

A delivery station (delivery apparatus) according to this embodiment is used for multiple areas. In each of the areas, one or more radio communication systems may be operated. In the respective areas, system information required to connect to the radio communication systems is delivered to terminal apparatuses in a common control signal. The common control signal may be delivered in a wired or wireless manner. Also, the delivery station may be installed in a base station.

The delivery station stores the system information required for the terminal apparatuses to connect to the radio communication systems within an area belonging to that delivery station. In other words, the delivery station stores the system information required for the terminal apparatuses to connect to the radio communication systems within the area covered by that delivery station. Also, the delivery station may store information on other delivery stations that are delivering to the same area as that belonging to that delivery station. In other words, the delivery station may store the information on other delivery stations that are delivering to the area covered by that delivery station. Also, the delivery station controls to deliver not only the system information on the area delivered by that delivery station but also the information on other delivery stations. Also, the delivery station delivers the system information and the information on other delivery stations.

[System]

A network including a delivery station according to this embodiment is described.

A delivery station according to this embodiment is used for multiple areas. In other words, a common control signal is delivered to multiple areas. In each of the areas, one or more radio communication systems may be operated. In the respective areas, system information required for terminal apparatuses to connect to the radio communication systems is delivered to the terminal apparatuses in a common control signal. The delivery station has information on the radio communication systems operated within the area belonging to (covered by) that delivery station so that the terminal apparatuses can connect to the radio communication systems. Here, the area may correspond to one mesh. Also, the information on the radio communication systems (referred to as system information hereinafter) may include frequency information and radio access schemes used in the radio communication systems together with charge information as operator information. Also, the frequency information may include a center frequency and bandwidth information. Also, the radio access schemes may include RAT (Radio Access Technology) information.

Even in an area where a radio communication system is operated by a radio operator, if the common control signal cannot be received, no communication using the radio communication system can be made. This is because the common control signal includes the system information. For this reason, it is envisaged that a large number of delivery stations may be deployed to ensure coverage. In this case, it is envisaged that an area (mesh) belonging to (covered by) a certain delivery station also belongs to (is covered by) other several delivery stations. In the area belonging to (covered by) the multiple delivery stations, the same common control signals are delivered from the delivery stations.

In this embodiment, under the case where the common control signals are delivered from the multiple delivery stations, the delivery stations are grouped based on delivery areas and/or types of delivery system information. In other words, it is determined which type of information is to be delivered from the delivery stations based on the delivery areas and/or the types of delivery system information.

There may be cases where a certain delivery station may have transmit power, an antenna height and so on different from those of other delivery stations. As a result, the certain delivery station would have coverage different from those of the other delivery stations. For this reason, one delivery station may be provided within a coverage area of another delivery station.

In this embodiment, the delivery stations are layered based on their location and/or coverage.

A network according to this embodiment is described with reference to FIG. 1. In this embodiment, the network includes multiple delivery stations 100 ($100_1$-$100_6$). These delivery stations are layered. In this embodiment, an exemplary case where the multiple delivery stations are layered in three levels based on their coverage and/or location is described. However, the delivery stations may be layered in two levels or four or more levels.

In FIG. 1, the delivery stations $100_1$-$100_6$ cover areas $50_1$-$50_6$, respectively. The area $50_1$ covered by the delivery station $100_1$ includes the areas $50_2$ and $50_3$ covered by the delivery stations $100_2$ and $100_3$, respectively. Also, the area $50_2$ covered by the delivery station $100_2$ includes the areas $50_4$ and $50_5$ covered by the delivery stations $100_4$ and $100_5$. Also, the area $50_3$ covered by the delivery station $100_3$ includes the area $50_6$ covered by the delivery station $100_6$.

In an area covered by a certain delivery station, other delivery stations preferably deliver to the respective coverage areas. For example, in the area $50_1$ covered by the delivery station $100_1$ deployed in the first layer, the delivery stations $100_2$ and $100_3$ deployed in the second layer preferably deliver to the respective coverage areas $50_2$ and $50_3$. Also, for example, in the area $50_2$ covered by the delivery station $100_2$ deployed in the second layer, the delivery stations $100_4$ and $100_5$ deployed in the third layer preferably deliver to the respective coverage areas $50_4$ and $50_5$. Also, for example, in the area $50_3$ covered by the delivery station $100_3$ deployed in the second layer, the delivery station $100_6$ deployed in the third layer preferably delivers to the coverage area $50_6$.

In this case, the delivery station $100_1$ belonging to the first layer may deliver a control signal to the areas covered by the delivery stations belonging to the second layer for indicating that the delivery stations belonging to the second layer are delivering a common control signal.

Figure 2:
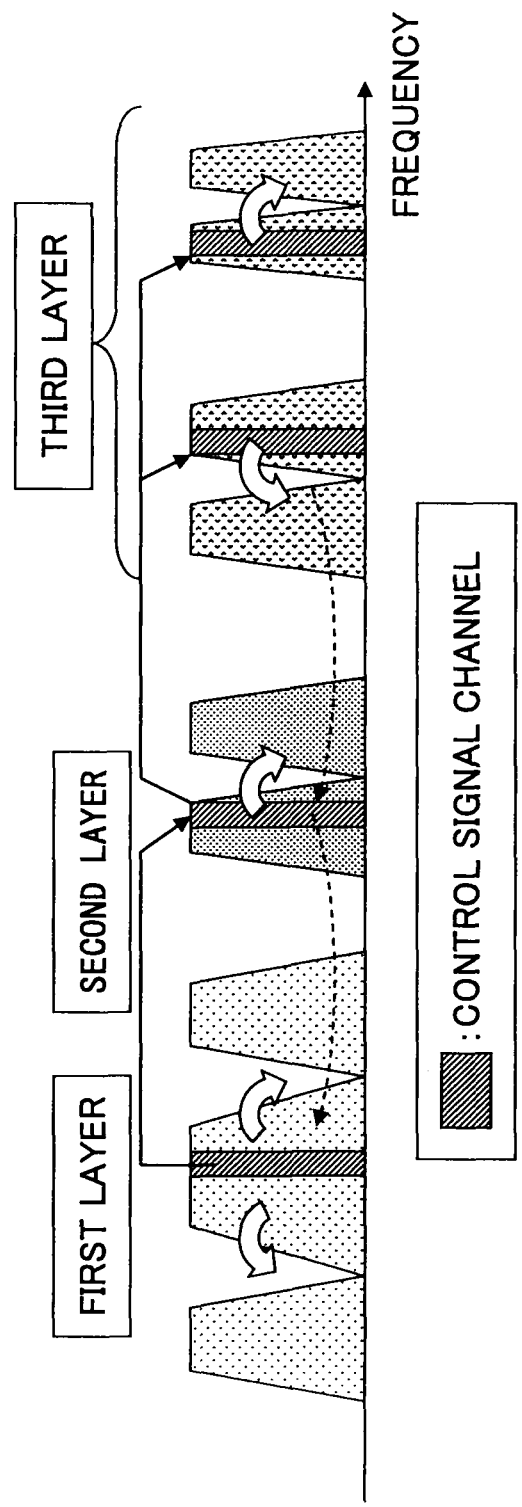
FIG. 2 is a conceptual diagram illustrating a frequency utilization method in a delivery station according to one embodiment.

An exemplary case where multiple delivery stations are divided based on types of delivery system information is described with reference to FIG. 2. It is preferable that a common control signal be delivered in a frequency band near frequency bands used by operated radio communication systems in order to simplify circuit configuration of a terminal apparatus and also reduce power consumption. To this end, in this embodiment, the frequency band for delivering the common control signal is divided for individual radio communication systems. Then, the common control signal is delivered near the frequency bands of the operated radio communication systems. For example, the common control signal is preferably delivered in a frequency band adjacent to the frequency bands of the operated radio communication systems. In FIG. 2, a common signal channel delivered in the frequency band adjacent to those of the operated radio communication systems is illustrated.

Even in the case where delivery stations cover the same area, if different operating frequency bands are utilized, the individual delivery stations deliver the control signal channel in a frequency band near the operating frequency bands. Then, a control signal for indicating the layer of the frequency band for delivering the common control signal and/or delivery station information delivering the common control signal may be delivered in a frequency band except for the frequency band for delivering the control signal channel. In this embodiment, a delivery station deployed in an upper layer of a delivery station of interest is referred to as an upper delivery station. Also, in this embodiment, a delivery station deployed in a lower layer of the delivery station of interest is referred to as a lower delivery station.

In this embodiment, the delivery station 100 stores and delivers information on lower delivery stations of the delivery station 100 of interest (referred to as lower delivery station configuration information hereinafter). Here, the lower delivery station of the delivery station 100 covers at least a portion of the area covered by the delivery station 100. The lower delivery station configuration information may include attribute information on the lower delivery stations. Also, the lower delivery station configuration information may include position information on the lower delivery stations and/or information indicative of areas covered by the lower delivery stations. Also, the lower delivery station configuration information may be dynamically updated. For example, the lower delivery station configuration information may be periodically updated. In this manner, dynamic change in frequency utilization methods due to variations in traffic amounts can be addressed. For example, the traffic may vary depending on delivery time zones. Also, in this manner, the delivery station 100 does not have to transmit system information on the lower delivery stations to that delivery station 100, which improves efficiency of the delivery information and the frequency utilization efficiency.

Also, multiple upper delivery stations may consist of an upper layer. In this manner, the upper delivery station does not have to transmit the system information on the lower delivery stations to that upper delivery station, and accordingly the efficiency of the delivery information can be further improved in the case where the multiple upper delivery stations use a part of or all the same radio communications systems or radio parameters. In other words, a portion or all of overlapping portions of the radio communication systems or the radio parameters do not have to be transmitted.

In this embodiment, a terminal apparatus determines to connect to which radio communication system based on the system information delivered from the delivery stations. The terminal apparatus initiates synchronization and connection in accordance with the radio parameters of the determined radio communication system.

The terminal apparatus compares position information and/or coverage range information on a delivery station, which are delivered from the delivery station, with terminal position information obtained at the terminal apparatus to determine to which delivery station the terminal apparatus belongs.

Also, the terminal apparatus obtains information on the lower delivery station to which that terminal apparatus belongs based on the lower delivery station configuration information advertised from the delivery station.

Also, if the terminal apparatus fails to obtain information from an upper delivery station, the terminal apparatus obtains the common control signal delivered from the upper delivery station based on upper delivery station information included in the delivery station information delivered from the resident delivery station to which that terminal apparatus belongs. Then, the terminal apparatus uses the common control signal delivered from the upper delivery station to obtain information on a delivery station, from which the system information on a connecting radio communication system can be obtained, and then belongs to the delivery station. For example, this embodiment is preferable in the case where the terminal apparatus cannot obtain information from the delivery station, from which the terminal apparatus could obtain the delivery station information, due to migration between delivery areas.

Figure 3:
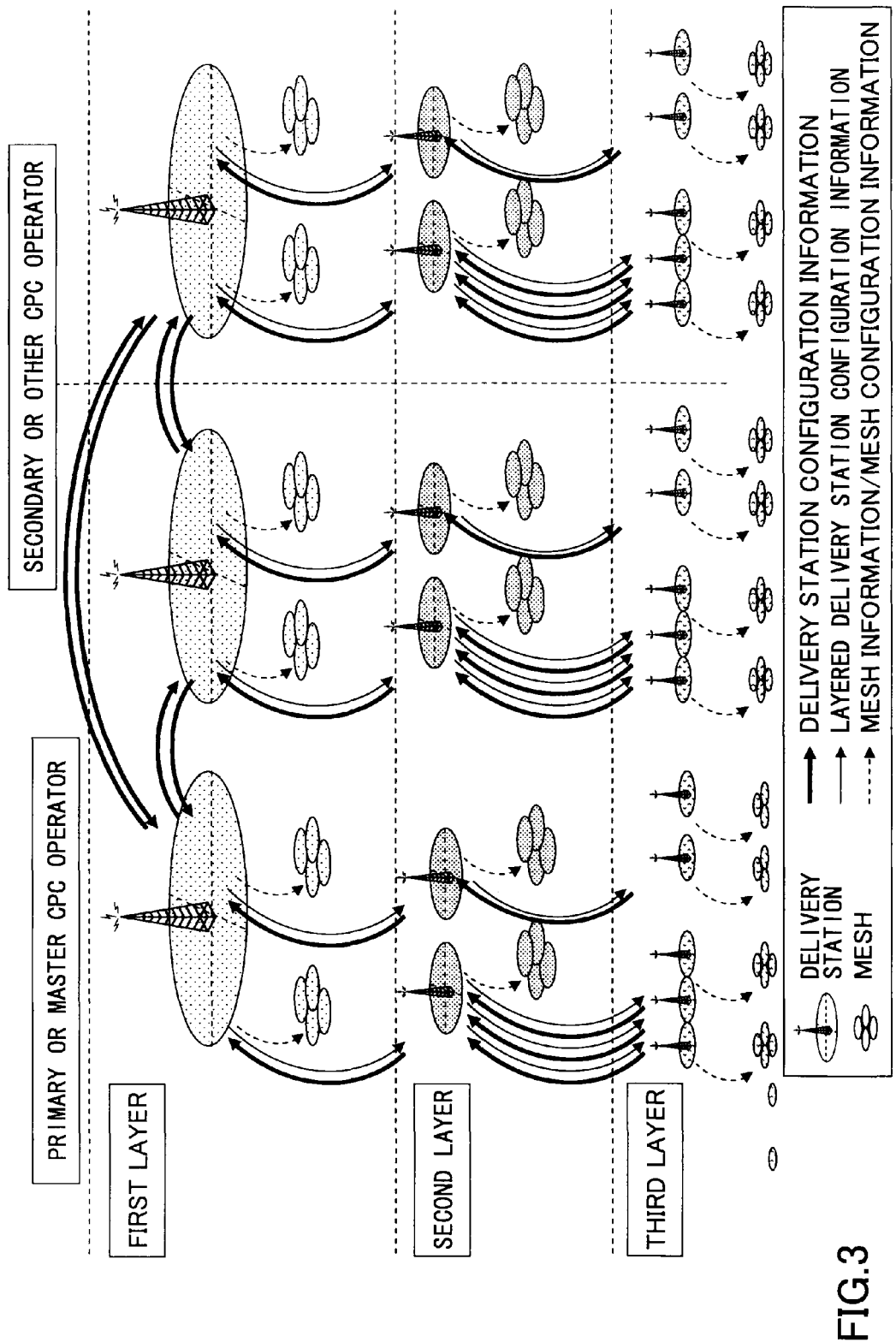
FIG. 3 is a conceptual view illustrating layered several delivery stations according to one embodiment.

In FIG. 3, a general conceptual view of a layered configuration of delivery apparatuses is illustrated. In FIG. 3, a delivery station transmits configuration information for that delivery station (delivery station configuration information) to an upper delivery station. Also, the delivery station delivers layer configuration information (layered delivery station configuration information) to lower delivery stations. The delivery station delivers mesh information and mesh configuration information to an area covered by the delivery station. Also, if there are multiple upper delivery stations, the individual upper delivery stations may be managed by different operators. For example, an operator for managing a certain upper delivery station may be referred to as a primary or master CPC operator. In this case, operators for managing the other upper delivery stations may be referred to as secondary or other CPC operators.

Broadcast information transmitted from a delivery station according to this embodiment is described.

Elements particularly relevant to the present embodiment are emphasized below, and the other elements may be omitted for simplicity.

The delivery station 100 transmits a common control signal to an area (mesh) covered by that delivery station 100. This area may include one or more radio communication systems. The delivery station 100 transmits the system information required for terminal apparatuses to connect the radio communication systems operated in the coverage area of the delivery station 100. The system information may be included in the common control signal. Here, the delivery information may be divided for individual delivery stations. Specifically, the common control signal is divided for the individual delivery stations. In transmissions of the system information required to connect to the radio communication systems operated in the coverage area of the delivery station 100, a cognitive pilot channel (CPC) may be applied.

Meanwhile, the common control signal delivered by the delivery station 100 includes a portion or all of information items of the system information required to connect to the radio communication systems operated in the delivery area. Also, the common control signal delivered by the delivery station 100 may include a portion or all of information items of lower delivery station information on a lower delivery station deployed within the delivery area. Also, the common control signal delivered by the delivery station 100 may include upper delivery station information on an upper delivery station of the delivery station 100.

In the conventional CPC, there is no provision of delivering information on a resident area to which the delivery station belongs, and the configuration of delivery stations conducting dynamic delivery is only changed. Herein, the configuration of the delivery stations includes a delivery method, a delivering frequency and so on.

[Broadcast Information]

Figure 4:
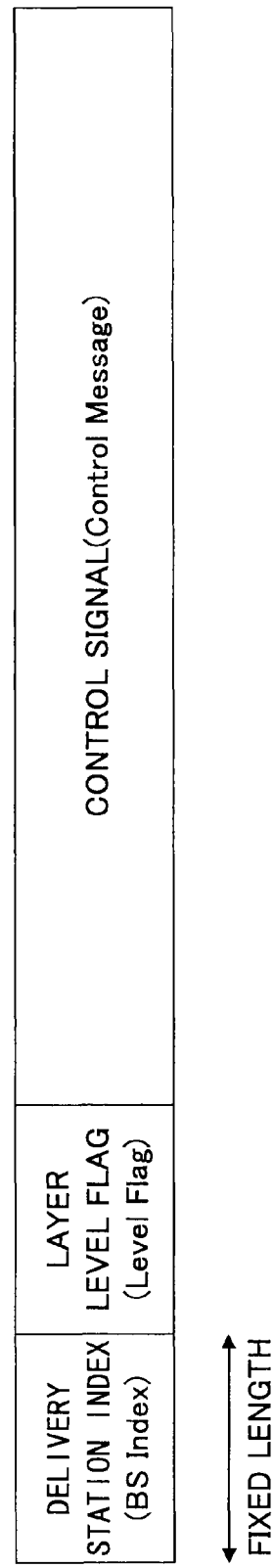
FIG. 4 is a schematic diagram illustrating an exemplary fundamental format of a control information signal delivered from a delivery station according to one embodiment.

Exemplary delivery information is described with reference to FIG. 4. A fundamental delivery format is described.

The fundamental delivery format of the delivery information includes a delivery station index or base station index (BS Index), a layer level flag (Level Flag) and a control signal (Control Message). The delivery station index may be fixed in length. The delivery station index is information indicative of a delivery station delivering information. The layer level flag indicates layer level information of a delivery station transmitting the delivery information. The control signal includes the delivery information consisting of system information and so on.

For example, if all component bits of the delivery station index are equal to "1"s, it may mean that the delivery information relates to delivery station information on a delivery station delivering that delivery information. Also, if the layer level flag is equal to 1, it may mean that the delivery information relates to lower delivery station information on a lower delivery station of that delivery station.

Figure 5:
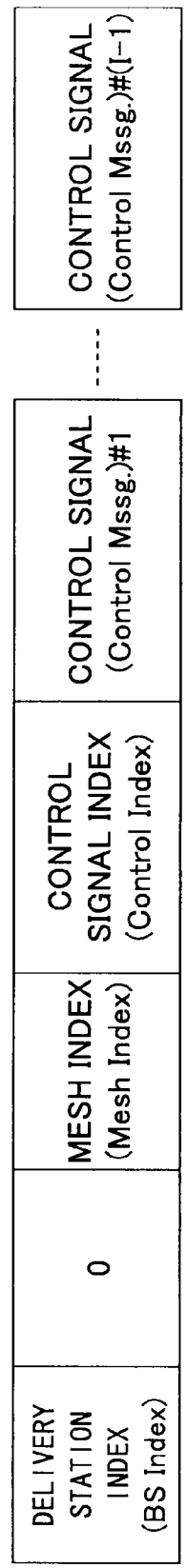
FIG. 5 is a schematic diagram illustrating an exemplary mesh control information signal delivered from a delivery station according to one embodiment.

An exemplary mesh control information signal is described with reference to FIG. 5.

Information associated with a radio communication system operated in a delivery area is delivered in a mesh control information signal. The mesh control information signal includes a mesh index (Mesh Index), a control signal index (Control Index) and a control signal (Control Message).

For example, the mesh index, the control signal index and the control signal may be included in a control signal portion of the fundamental delivery format. In this case, the delivery station index may include an index (delivery station index) of a delivery station (CPC-BS). Also, the layer level flag may include a zero "0". The zero may indicate information for each mesh. The mesh index is information indicative of a delivery area. The control signal index is information indicative of multiple types of information delivered to a delivery area and included in the delivery information. The control signal index may indicate an amount of control information relative to the delivery information. For example, the amount of control information may include linker information indicative of the number of control signals (Control Mssg. number) and the first bits of the individual control signals (Control Mssg.). The linker may include information such as a bit number position.

The control signal (Control Mssg.) delivered in the mesh control information signal includes control signals necessary for connection by a terminal apparatus. For example, the control signals include available operator information. The available operator information may include an available operator name, available frequency information, available RAT information and maximum transmit power information. Here, the available frequency information may include several frequency information pieces such as frequency information 1 and frequency information 2. Also, the available RAT information may include multiple RAT information pieces. The RAT information may include synchronization signal information. Also, the maximum transmit power information may include multiple maximum transmit power information pieces. Also, multiple available operator information pieces may be included.

Meanwhile, usual CPC delivery information includes connection information. The connection information includes information to search for a connectable operator, information to search for a connectable RAT and maximum transmit and receive power (relative to interference system from the thirds).

An exemplary mesh configuration information signal is described with reference to FIG. 6.

In the mesh configuration information signal, all mesh indices in the mesh control information signal are set to "1"s. In this case, position information on an area (mesh) covered by a delivery station and area range information on that area are delivered. For this reason, it is preferable that the number of bits of the mesh index in the mesh control information signal be the same as the number of bits of the mesh index specified in the mesh configuration information signal.

The mesh configuration information includes the number of meshes to be delivered by a delivery station and mesh information (mesh Mssg) on the meshes. For example, the number of meshes and the mesh information may be included in a control signal portion of the fundamental delivery format. In this case, the BS Index may include a delivery station index of the delivery station. Also, since the mesh configuration information is for the meshes to which the delivery station belongs, the layer level flag may include a zero "0". The zero may indicate information for each mesh. The mesh indices may be "1 . . . 1" (all "1"s). By setting to all "1"s, the mesh configuration information on the area covered by the delivery station may be represented.

The number of meshes corresponds to the number of areas covered by the delivery station of interest among one or more delivery areas of the delivery stations 100. The mesh information is position information on the multiple areas or area range information on the areas. For example, the mesh indices, the mesh positions, mesh coverage ranges (e.g., 100 m) and mesh delivery methods may be included. The mesh delivery method may be optional. The mesh delivery methods may include the broadcast type delivery method, the on-demand type delivery method or the hybrid type delivery method of the broadcast type delivery method and the on-demand type delivery method. The mesh delivery method may be specified in cases where different delivery methods are applied for different meshes. The position information may include information indicating the center coordinate of the area in degrees of latitude and longitude. The area range information may include information indicating a radius from the center coordinate of the area.

Figure 7:
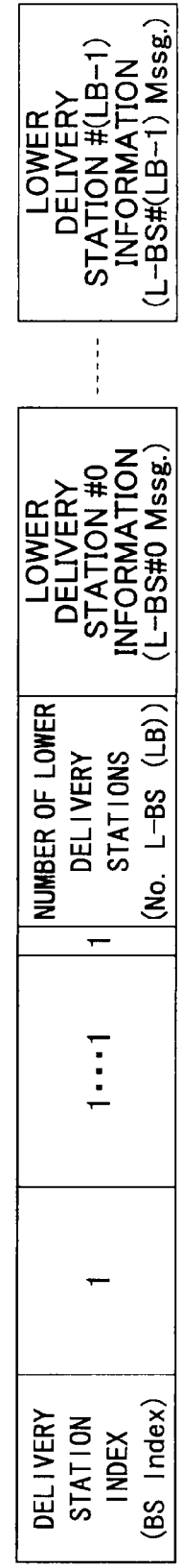
FIG. 7 is a schematic diagram illustrating an exemplary lower delivery station configuration information signal delivered from a delivery station according to one embodiment.

An exemplary lower delivery station configuration information signal associated with the delivery station is described with reference to FIG. 7.

The lower delivery station configuration information signal includes information on a lower delivery station under the case where a delivery station delivering the lower delivery station configuration information signal is considered as an upper delivery station. The lower delivery station configuration information signal includes the number of lower delivery stations (No. L-BS (LB)) and lower delivery station information (L-BS#N Mssg) (where N is an integer and corresponds to the N-th lower delivery station). For example, the number of lower delivery stations and the lower delivery station information may be included in a control message portion of the fundamental delivery format. In this case, the delivery station index may include a delivery station index of a delivery station. Also, the layer level flag may be set to "1" if information on a lower delivery station is delivered. An L-mesh index may be set to "1 . . . 1" (all ones), and the mesh configuration information on an area covered by the delivery station may be represented by setting to all ones.

The lower delivery station information includes information required to receive a common control signal delivered from a lower delivery station. The information required to receive the common control signal from the lower delivery station may include a delivery station index of the lower delivery station, position information of the deployed lower delivery station, area range information on an area delivered by the lower delivery station, information on a delivery method of the lower delivery station and so on. Here, the delivery method of the lower delivery station may include a frequency, a radio scheme, a bandwidth, a synchronization scheme with the lower delivery station, a synchronization signal type and a delivery method (the broadcast type delivery method, the on-demand type delivery method or the hybrid type delivery method of the broadcast type delivery method and the on-demand type delivery method). Specifically, the number of lower delivery stations includes the number of lower delivery stations belonging to a delivery station delivering the lower delivery station information. The L-BS#i information includes delivery station information on a lower delivery station belonging to a delivery station delivering the lower delivery station information. The delivery station information on the lower delivery station may include a delivery station index of the lower delivery station, the position information of the deployed lower delivery station, the range information on the delivery area of the lower delivery station (e.g., 500 m) and the delivery method information on the lower delivery station (the broadcast type delivery method, the on-demand type delivery method or the hybrid type delivery method of the broadcast type delivery method and the on-demand type delivery method). The delivery method information may include a frequency, a radio RAT, a band, a synchronization signal and a delivery method.

Figure 8:
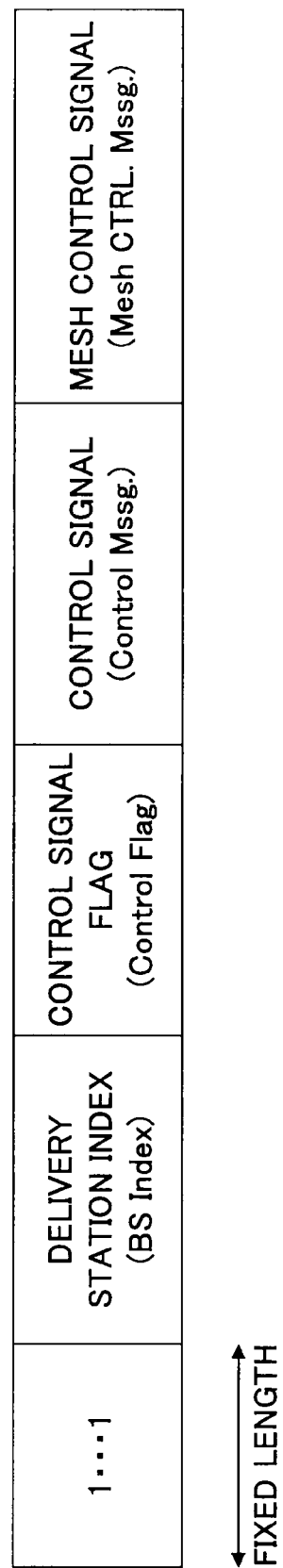
FIG. 8 is a schematic diagram illustrating an exemplary delivery station information signal delivered from a delivery station according to one embodiment.

An exemplary delivery station information signal is described with reference to FIG. 8.

The delivery station information includes operation policy information, a delivery station index (BS Index), a control signal flag (Control Flag), a control signal (Control Mssg.) and a mesh control signal (Mesh CTRL. Mssg) for a delivery station delivering the delivery station information of interest.

It is preferable that several first bits are set to "1 . . . 1" (all "1"s) for indicating the delivery information signal. Particularly, it is preferable that the several first bits have the same bit length as the length of bits indicative of the delivery station index due to easier determination by a terminal apparatus as to delivery of the delivery station information.

The delivery station index is information indicative of an identification index of a delivery station delivering the delivery station information. The control signal flag is information indicative of control information included in the delivery station information. The control signal flag may be a flag for indicating information such as a delivery method of a delivery station.

The control signal includes information indicative of a delivery method of a delivery station. The delivery information signal may include position information on the deployed delivery station, a delivery range and a delivery method (the broadcast type delivery method, the on-demand type delivery method or the hybrid type delivery method of the broadcast type delivery method and the on-demand type delivery method). In addition, the delivery information signal may include information on a delivery operator operating a delivery station. By delivering the position information and the delivery range information for the delivery station, if the position information of the delivery station does not match the position information searched for by a terminal apparatus, another delivery station may be searched for.

The control information signal included in the delivery station information signal may include delivery information (including a delivery method, a deployed position and so on for an upper delivery station) of the upper delivery station to which a delivery station delivering the control information signal belongs. The control information signal included in the delivery information signal may include delivery target environment, frequency band information and operation information on a delivery target of the delivery station. If the upper delivery station is the highest ranked delivery station (delivery station having no upper delivery station), all bits of the control signal may be set to zeros "0"s for indicating the highest ranked delivery station.

The delivery method information for indicating the broadcast type/the on-demand type/the hybrid type of delivery methods may include an uplink parameter for requesting to deliver the control signal if the delivery method information indicates the on-demand type delivery method or the hybrid type delivery method. The uplink parameter may include a frequency, a radio RAT, a frequency band and radio scheme information to use the uplink.

The delivery target environment includes information on indoor or outdoor. The envisaged environment may be indicated if available environment information is needed.

The envisaged frequency band includes information indicating whether a frequency band is licensed or unlicensed.

The control information signal included in the delivery station information may include information on operations of a delivery station deployed in the same level. The same level operation information includes operators of other delivery stations, a delivery station redundant method and so on. The same level operation information may include the number of operators at the same level, the number of operated delivery stations at the same level, a flag indicative of their operation states (flag indicative of primary or secondary operation), operator information and operation parameters at the same level. For example, in C-band, an operator between 3.4 GHz and 3.6 GHZ may be considered as a primary operator, and an operator above 3.6 GHz may be considered as a secondary operator. In this manner, the delivery station information can be first received from the primary operator, which can also connect to the secondary operator and handle a frequency band corresponding to the secondary operator.

The mesh control signal (Mesh CTRL Mssg.) in the delivery station information consists of information required to obtain deployment information on lower delivery stations belonging to a delivery station and information required to obtain configuration information on meshes belonging to the delivery station. For example, the mesh control signal includes the length of bits of the delivery station index (L-BS Index) of the lower delivery station.

[Delivery Method]

Figure 9:
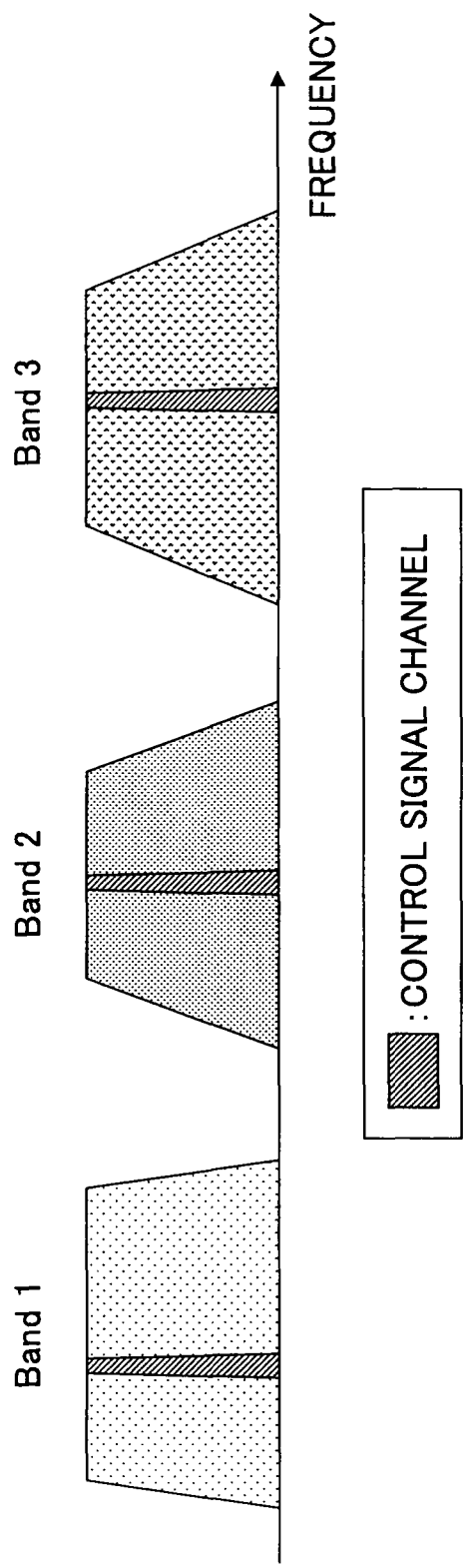
FIG. 9 is a schematic diagram illustrating an exemplary channel utilization method for describing an operation of a delivery station according to one embodiment.
Figure 10:
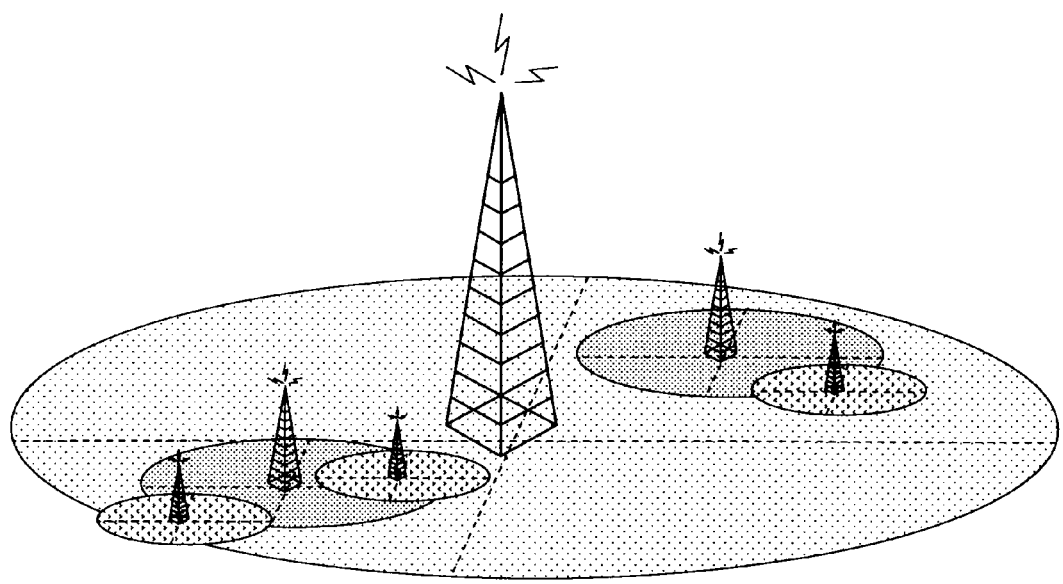
FIG. 10 is a conceptual diagram illustrating exemplary deployment of delivery stations for describing operations of the delivery stations according to one embodiment.

A delivery method according to this embodiment is described with reference to FIGS. 9, 10, 11A and 11B. FIG. 9 illustrates exemplary channel assignment. FIG. 10 illustrates exemplary deployment of delivery stations. FIGS. 11A and 11B illustrate operations before initiation of data communication between a terminal apparatus and a base station. As stated above, the base station may include a delivery station. In FIGS. 9 and 10, the same hatchings are drawn to frequency bands operated by delivery stations and coverage areas.

In this embodiment, a delivery station utilizing band 1 (referred to as delivery station (Band 1)), a delivery station utilizing band 2 (referred to as delivery station (Band 2)) and a delivery station utilizing band 3 (referred to as delivery station (Band 3) are provided. Other cases where two delivery stations and four or more delivery stations can be similarly handled. Also in this embodiment, as one example, a terminal apparatus resides in an area of a delivery station utilizing band 3, and an operation of the terminal apparatus before initiation of communication upon receipt of the control signal is described. For example, the delivery station (Band 2) may reside in a coverage area of the delivery station (Band 1), and the delivery station (Band 3) may reside in a coverage area of the delivery station (Band 2). As one exemplary delivery method, the broadcast type delivery method is applied, and operations of the terminal apparatus under the case are described.

Since the delivery station utilizes the broadcast type delivery method, delivery station configuration information, layered delivery station configuration information, mesh configuration information and mesh control information are periodically broadcast. In the illustrations, however, they are selectively described in conjunction with operations of the terminal apparatus.

The delivery station comprehends deployment of delivery stations (delivery station deployment position information and delivery methods) (step S1102).

The terminal apparatus starts to search for a common control channel to detect a connectable target (step S1104).

The terminal apparatus conducts synchronization based on control information delivered from the delivery station (Band 1) in a fundamental band to obtain control information (step S1106). The control information includes delivery station configuration information. The delivery station configuration information includes configuration information on a base station utilizing band 1. The configuration information may include position information, RAT information and so on. For example, the delivery station (Band 1) delivers fundamental information on a radio communication system operated in the entire area. The terminal apparatus obtains the position information on the delivery station (Band 1) from the control information. Then, the terminal apparatus determines that it belongs to the delivery station (Band 1) (step S1108).

The delivery station (Band 1) periodically delivers the layered delivery station configuration information (step S1110). The layered delivery station configuration information includes configuration information on layered delivery stations belonging to the delivery station (Band 1). The layered delivery stations may include a lower delivery station and/or an upper delivery station. The layered delivery station configuration information may include position information, a delivery method, RAT information and so on for the layered stations.

The terminal apparatus obtains the position information on a delivery station (lower delivery station) belonging to the delivery station (Band 1). Then, the terminal apparatus determines that it belongs to the delivery station (Band 2) and migrates the delivery station (Band 2) (step S1112). For example, the terminal apparatus determines whether there is a delivery station covering the position of the terminal apparatus based on the position information on the lower delivery station belonging to the delivery station (Band 1). Then, if the terminal apparatus determines that such a delivery station exists, the terminal apparatus obtains frequency information and the delivery method for that delivery station.

The delivery station (Band 2) periodically delivers control signals of Band 2. Similar to that of Band 1, the control information includes the delivery station configuration information, layered delivery station configuration information on Band 2, mesh configuration information and mesh control information. The delivery station configuration information includes configuration information on the delivery station (Band 2). This configuration information may include position information, RAT information and so on.

Upon determining that the terminal apparatus belongs to the delivery station (Band 2), the terminal apparatus synchronizes with the delivery station (Band 2). The terminal apparatus obtains the delivery station configuration information on Band 2 from the control signal of Band 2 (step S1114). The terminal apparatus receives control information delivered from the delivery station (Band 2). The terminal apparatus obtains the position information of the delivery station (Band 2) from the control information. Then, the terminal apparatus determines that it belongs to the delivery station (Band 2) (step S1116).

The delivery station (Band 2) delivers the layered delivery station configuration information (step S1118). The layered delivery station configuration information includes configuration information on layered delivery stations belonging to the delivery station (Band 2). The layered delivery station may include a lower delivery station and/or an upper delivery station. The layered delivery station configuration information may include position information, a delivery method, RAT information and so on for the layered station.

The terminal apparatus obtains layer information on the delivery station (band 2). Then, the terminal apparatus obtains position information on lower delivery stations belonging the delivery station (Band 2). Then, the terminal apparatus determines that it belongs to the delivery station (Band 3) and migrates to the delivery station (Band 3) belonging to the delivery station (Band 2) (step S1120).

The delivery station (Band 3) transmits a control signal of Band 3 (step S1122). The control information includes delivery station configuration information. The delivery station configuration information includes configuration information on the delivery station (Band 3). The configuration information may include position information, RAT information and so on.

The terminal apparatus synchronizes with the delivery station (Band 3). Then, the terminal apparatus receives the control information delivered from the delivery station (Band 3). The terminal apparatus obtains the position information on the delivery station (Band 3) from the control information. Then, the terminal apparatus determines that it belongs to the delivery station (Band 3) (step S1124).

The delivery station (Band 2) transmits the layered delivery station configuration information (step S1126). The layered delivery station configuration information includes configuration information on layered delivery station belonging to the delivery station (Band 3). The layered delivery station may include a lower delivery station and/or an upper delivery station. The layered delivery station configuration information may include position information, a delivery method, RAT information and so on for the layered station.

The terminal apparatus obtains the layer information on the delivery station (Band 3). Then, the terminal apparatus obtains the position information on the delivery stations belonging to the delivery station (Band 3). For example, the terminal apparatus determines whether there is a delivery station covering the position of the terminal apparatus based on the position information on the delivery station belonging to the delivery station (Band 3). Then, if such a delivery station exists, the terminal apparatus obtains frequency information and a delivery method for that delivery station. As a result, the terminal apparatus determines that it belongs to a mesh operated in Band 3.

The delivery station (Band 3) transmits mesh configuration information (step S1130). The mesh configuration information includes mesh configuration information associated with the delivery station (Band 3). The mesh configuration information includes position information, a coverage area and so on for meshes. For example, the delivery station (Band 3) obtains mesh information on a mesh to which the terminal apparatus belongs based on the position information for the mesh. The mesh configuration information may include a mesh index and so on.

The terminal apparatus obtains the mesh configuration information for the delivery station (Band 3). Then, the terminal apparatus determines that the delivery station (Band 3) belongs to mesh #i covered by the delivery station (Band 3) (step S1132).

The delivery station (Band 3) transmits mesh control information (step S1134). The mesh control information includes mesh control information associated with the delivery station (Band 3). The mesh control information includes intra-mesh RAT information and frequency information on that mesh.

The terminal apparatus obtains the mesh control information on the delivery station (Band 3). Then, the terminal apparatus obtains information indicative of an operating method for mesh #i of the delivery station (Band 3). Then, the terminal apparatus conducts connection to a communication station covered by the delivery station (Band 3) (step S1136).

The terminal apparatus connects to the communication station and initiates the communication (step S1138).

In the flow illustrated in FIGS. 11A and 11B, the delivery station (Band 1), the delivery station (Band 2) and the delivery station (Band 3) may periodically transmit the delivery station configuration information, the layered delivery station configuration information, the mesh configuration information and the mesh control information. For example, the terminal apparatus may conduct operations corresponding to the respective information items at transmission intervals of the delivery station configuration information, the layered delivery station configuration information, the mesh configuration information and the mesh control information or conduct the next operations based on information items transmitted at the next cycle.

Note that the above-mentioned embodiment can be applied to the on-demand type delivery method. In the on-demand type delivery method, a delivery request is issued in an uplink based on the delivery station information obtained from an upper delivery station in the synchronization with individual delivery stations. Similar to operations on the cognitive pilot channel for the delivery station (Band 1), a predefined frequency band and radio scheme are utilized. Alternatively, some delivery station detection technique is implemented in the terminal apparatus.

[Method of Calculating Resident Mesh Index from Position of Terminal Apparatus]

(1) A delivery station indicates mesh center position. The mesh center position may include latitude and longitude information, for example.

(2) A terminal apparatus calculates error information based on the position information detected by the terminal apparatus and the indicated mesh center position. For example, the error information may be derived by calculating (the detected position information minus the indicated mesh center position)$^2$.

(3) The terminal apparatus determines the closest mesh to the terminal apparatus as a resident mesh. For example, the terminal apparatus may determine the mesh corresponding to the mesh center position having a smaller error as the resident mesh based on the error information derived in (2).

This method is preferable for the broadcast type delivery method. The method can be applied to the on-demand type delivery method and the hybrid type delivery method.

[Another Method of Calculating Resident Mesh Index from Position of Terminal Apparatus]

(1) A terminal apparatus uses an uplink from the terminal apparatus to a delivery apparatus to transmit obtained position information to the delivery apparatus.

(2) The delivery apparatus derives resident mesh information.

(3) The delivery apparatus delivers the resident mesh information to the terminal apparatus.

This method can be applied to the on-demand type delivery method and the hybrid type delivery method.

[Method of Determining Resident Lower Delivery Station from Terminal Position]

A terminal apparatus obtains information on a delivery station to which the terminal apparatus is to belong to based on the position of the terminal apparatus and the position of the delivery station indicated together with available bands.

The terminal apparatus synchronizes in a band of the resident delivery station and obtains the delivery station information again.

[Utilization Example of Layered Signal]

An exemplary application of a layered signal such as the above-mentioned delivery station configuration information, layered delivery station configuration information, mesh configuration information and mesh control information is described with reference to FIG. 12.

Spectrum aggregation where a band including multiple bands is treated as a super broad band and communications are made using the super broad band is being discussed. In scanning a band utilization state at start of communication, a terminal apparatus receives and analyzes a common control signal in a band including a center frequency of the super broad band. Utilization method information on the subdivided multiple bands in the super broad band is described in the common control signal. In other words, the common control signal includes the information indicative of the utilization method of the multiple bands. The terminal apparatus analyzes the information indicative of the utilization method to migrate to a connecting smaller band and conduct connection operations. FIG. 12 illustrates an exemplary application of the spectrum aggregation. In FIG. 12, the terminal apparatus receives and analyzes the common control signal in the band including the center frequency of the super broad band. Information indicative of utilization methods of the three subdivided bands in the super broad band is described in the common control signal. The terminal apparatus analyzes the information indicative of the utilization methods to migrate to any of the three bands and conduct the connection operations.

[Other Utilization Examples of Layered Signal]

Another exemplary application of a layered signal such as the above-mentioned delivery station configuration information, layered delivery station configuration information, mesh configuration information and mesh control information is described with reference to FIG. 13.

There is a band utilization case where a portion of an area may become a reception disabled area due to interference from an adjacent cell in multi-cell environment. For this reason, one large (broad) band is subdivided into multiple smaller bands. Then, each of the bands is assigned to a base station. Meanwhile, it is envisaged that such a large (broad) band is directly assigned to the base station in indoor environment and so on. In such environment, a terminal apparatus must be able to utilize radio schemes corresponding to individual operation methods, which may impose greater burden to the terminal apparatus.

According to the present scheme, however, even if areas having different operating bandwidths exist in the same band, the operation is feasible by assigning the common control signal to the band center. In the case of the operation in the subdivided bands, the operation is feasible by applying the control signal information for the respective subdivided bands to a control signal at the band center. FIG. 13 illustrates an operation method in band subdivision. This operation method may be referred to as layered-OFDM. Also, it may be referred to as carrier aggregation. In FIG. 13, in the case of the operation in band subdivision, a control channel for indicating utilization states in the respective bands is transmitted in the subdivided bands. In addition, information indicative of band utilization methods is transmitted in the subdivided bands including the center frequency.

[First Delivery Apparatus]

Figure 14:
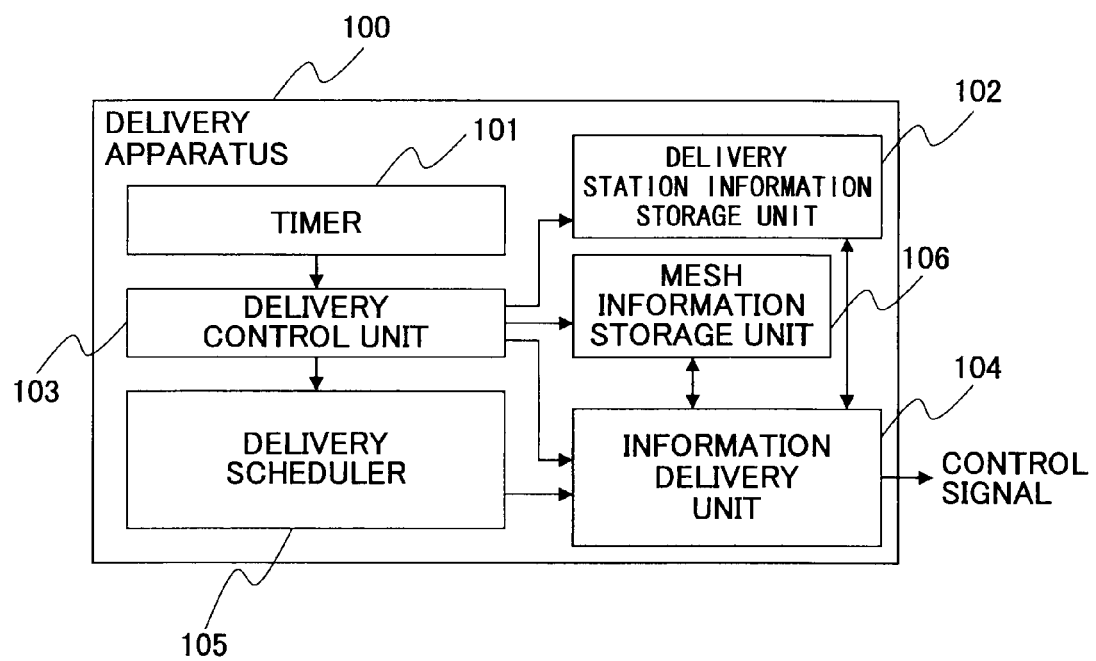
FIG. 14 is a first functional block diagram illustrating a delivery apparatus according to one embodiment.

A delivery apparatus applied to the above-mentioned radio communication system is described with reference to FIG. 14.

A delivery apparatus 100 according to this embodiment uses the broadcast type broadcasting for periodically broadcasting a common control signal.

The delivery apparatus 100 includes a timer 101, a delivery station information storage unit 102, a delivery control unit 103, an information delivery unit 104, a delivery scheduler 105 and a mesh information storage unit 106.

The delivery station information storage unit 102 stores information on a lower delivery station.

The mesh information storage unit 106 stores common control information for delivery. Also, the mesh information storage unit 106 supplies the common control information or the lower delivery station information for a delivery area incoming from the information delivery unit 104 to the information delivery unit 104.

The delivery control unit 103 controls delivery by the delivery apparatus 100. For example, the delivery control unit 103 supplies an information item to be delivered to the delivery scheduler 105 and/or the information delivery unit 104 based on time information periodically supplied from the timer 101. If the common control signal is to be delivered to an area, the delivery control unit 103 supplies a mesh index of the delivery area. If mesh configuration information is to be delivered, the delivery control unit 103 supplies the mesh configuration information. Also, if lower delivery station configuration information is to be delivered, the delivery control unit 103 supplies the lower delivery station configuration information to the information delivery unit 104. Further, the delivery control unit 103 supplies information indicating that the delivery scheduler 105 indicates information to be delivered to the information delivery unit 104. The information delivery unit 104 delivers information stored in the delivery station information storage unit 102 or the mesh information storage unit 106 in accordance with a predefined radio scheme. The delivery scheduler 105 selects a signal type for delivery based on a delivery timing indicated from the delivery control unit 103.

The delivery control unit 103 may modify operated mesh configuration or lower delivery station configuration based on the time information supplied from the timer 101. If the mesh configuration or the lower delivery station configuration has to be modified, the delivery control unit 103 indicates information on the modified configuration to the delivery station information storage unit 102 and/or the mesh information storage unit 106. The delivery station information storage unit 102 and/or the mesh information storage unit 106 reorganizes delivery control information corresponding to the delivery information type based on the indicated information.

[First Terminal Apparatus]

Figure 15:
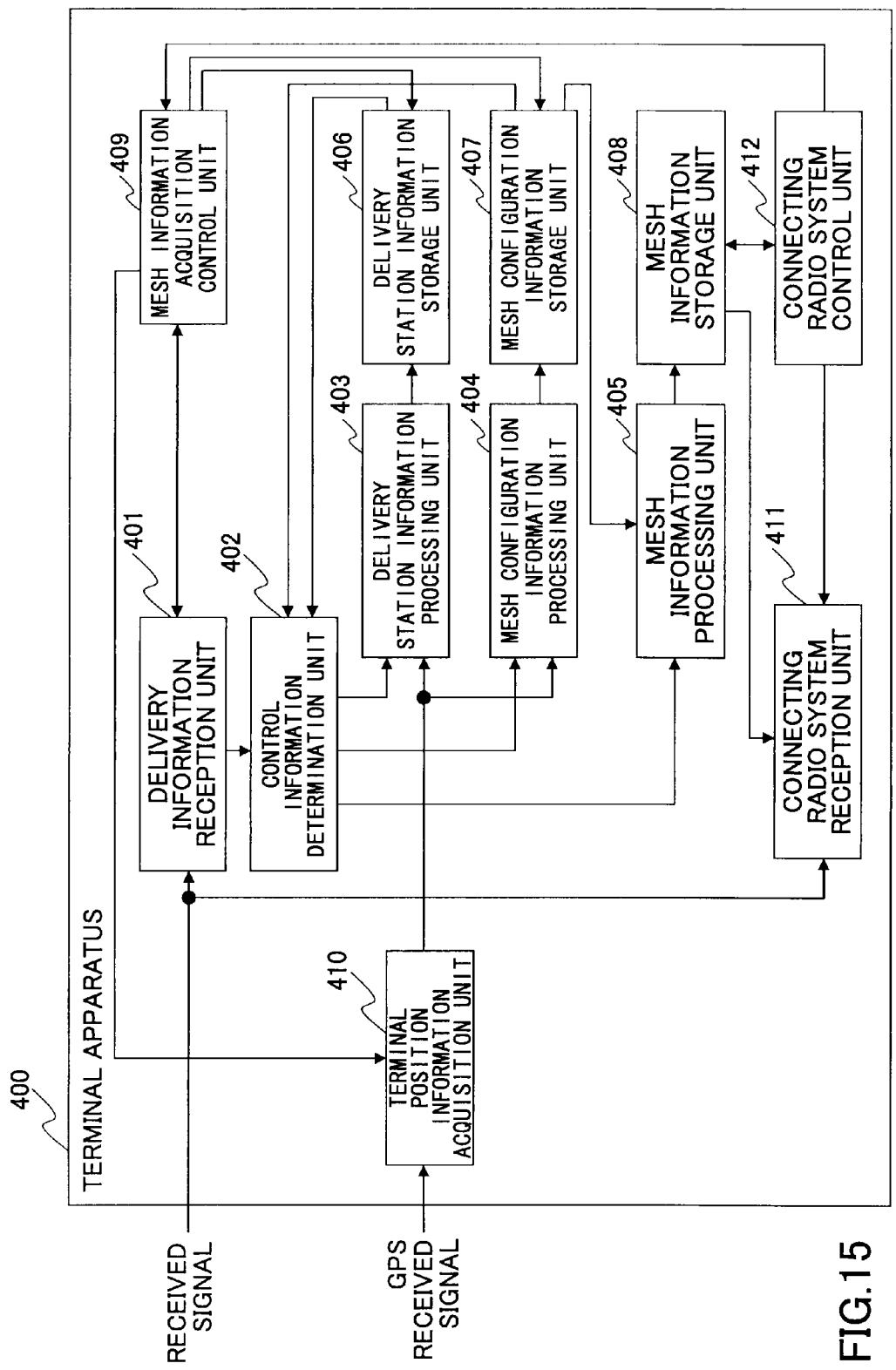
FIG. 15 is a first functional block diagram illustrating a terminal apparatus according to one embodiment.

A terminal apparatus according to this embodiment is described with reference to FIG. 15. A terminal apparatus 400 obtains information delivered from the delivery apparatus 100. For example, the terminal apparatus 400 receives a common control signal periodically delivered from the delivery apparatus 100. Then, the terminal apparatus obtains information on an area where the terminal apparatus resides. For example, the terminal apparatus 400 receives the common control signal delivered from the delivery apparatus 100 in accordance with the broadcast type delivery.

The terminal apparatus 400 includes a delivery information reception unit 401, a control information determination unit 402, a delivery station information processing unit 403, a mesh configuration information processing unit 404, a mesh information processing unit 405, a delivery station information storage unit 406, a mesh configuration information storage unit 407, a mesh information storage unit 408, a mesh information acquisition control unit 409, a terminal position information acquisition unit 410, a connecting radio system reception unit 411 and a connecting radio system control unit 412.

The delivery information reception unit 401 receives a common control signal from the delivery apparatus 100 and converts to bit information. The delivery information reception unit 401 transmits the received and converted bit information signal to the control information determination unit 402.

The control information determination unit 402 determines the type of delivery information based on the received bit information. If the type of delivery information relates to information on a delivery station, the control information determination unit 402 indicates information represented in the bit information to the delivery station information processing unit 403. If the type of delivery information relates to information on mesh configuration, the control information determination unit 402 indicates the information represented in the bit information to the mesh configuration information processing unit 404. If the type of delivery information relates to information on mesh information, the control information determination unit 402 indicates the information represented in the bit information to the mesh information processing unit 405.

If the control information determination unit 402 determines that the delivery information type relates to the information on the delivery station 100, the delivery station information processing unit 403 receives information on the delivery station 100. Also, the delivery station information processing unit 403 compares the received delivery station information with position information of the terminal apparatus 400 supplied from the terminal position information acquisition unit 410 to determine which delivery station the terminal apparatus 400 belongs to. In addition to that determination, the delivery station information processing unit 403 may process information on the resident delivery station and store it in the delivery station information storage unit 406. Here, the information on the resident delivery station preferably includes an information item other than the position information and the range information for the delivery station. Also, for information on a non-resident delivery station to which the terminal apparatus 400 does not belong, the delivery station information processing unit 403 may add information indicating that the terminal apparatus 400 does not belongs to that delivery station to the delivery station information and store it in the delivery station information storage unit 406.

If the control information determination unit 402 determines that the delivery information type relates to the mesh configuration information, the mesh configuration information processing unit 404 receives the mesh configuration information. Also, the mesh configuration information processing unit 404 compares the received mesh configuration information with the position information of the terminal apparatus 400 supplied from the terminal position information acquisition unit 410 to determine which area the terminal apparatus 400 belongs to. The mesh configuration information processing unit 404 stores information on the resident area where the terminal apparatus 400 belongs to in the mesh configuration information storage unit 407. For information on a non-resident area or layered areas to which the terminal apparatus 400 does not belong, the mesh configuration information processing unit 404 may add information indicating that the terminal apparatus 400 does not belong to that area to the mesh configuration information and store it in the mesh configuration information storage unit 407.

If the control information determination unit 402 determines that the delivery information type relates to the mesh information, the mesh information processing unit 405 receives the mesh information. Also, the mesh information processing unit 405 compares the received mesh information with the mesh configuration information stored in the mesh configuration information storage unit 407 to determine system information on the resident area where the terminal apparatus 400 belongs to. The mesh information processing unit 405 determines the system information on the determined resident area and stores it in the mesh information storage unit 408. For information on a non-resident area to which the terminal apparatus 400 does not belong, the mesh information processing unit 405 adds information indicating that the terminal apparatus 400 does not belong to the area to the information and store it in the mesh information storage unit 408.

The mesh information storage unit 408 receives a request signal for the system information for a possible connecting radio communication system from the connecting radio system control unit 412 and indicates the system information to the connecting radio system information processing unit 411 and the connecting radio system control unit 412.

In response to a reception indication of the common control signal supplied from the delivery information reception unit 401, the mesh information acquisition control unit 409 transmits the delivery station information in the delivery station information storage unit 406 to the control information determination unit 403. Also, in response to a reception indication of the common control signal supplied from the delivery information reception unit 401, the mesh information acquisition control unit 409 transmits the mesh configuration information in the mesh configuration information storage unit 407 to the control information determination unit 403.

Also, the mesh information acquisition control unit 409 indicates that the terminal position information acquisition unit 410 outputs the position information of the terminal apparatus 400.

Also, if the connecting radio system control unit 412 indicates frequency band information on a connecting radio communication system, the mesh information acquisition control unit 409 transmits that information to the delivery station information storage unit 406 or the mesh configuration information storage unit 407. Also, the if there is information on a relevant delivery station, the mesh information acquisition control unit 409 indicates it to the mesh information processing unit 405. Also, if the relevant delivery station uses a different delivery frequency band, the mesh information acquisition control unit 409 indicates the relevant frequency band and a synchronization signal type to the delivery information reception unit 401, which receives the common control signal delivered in that frequency band.

[Second Delivery Apparatus]

Figure 16:
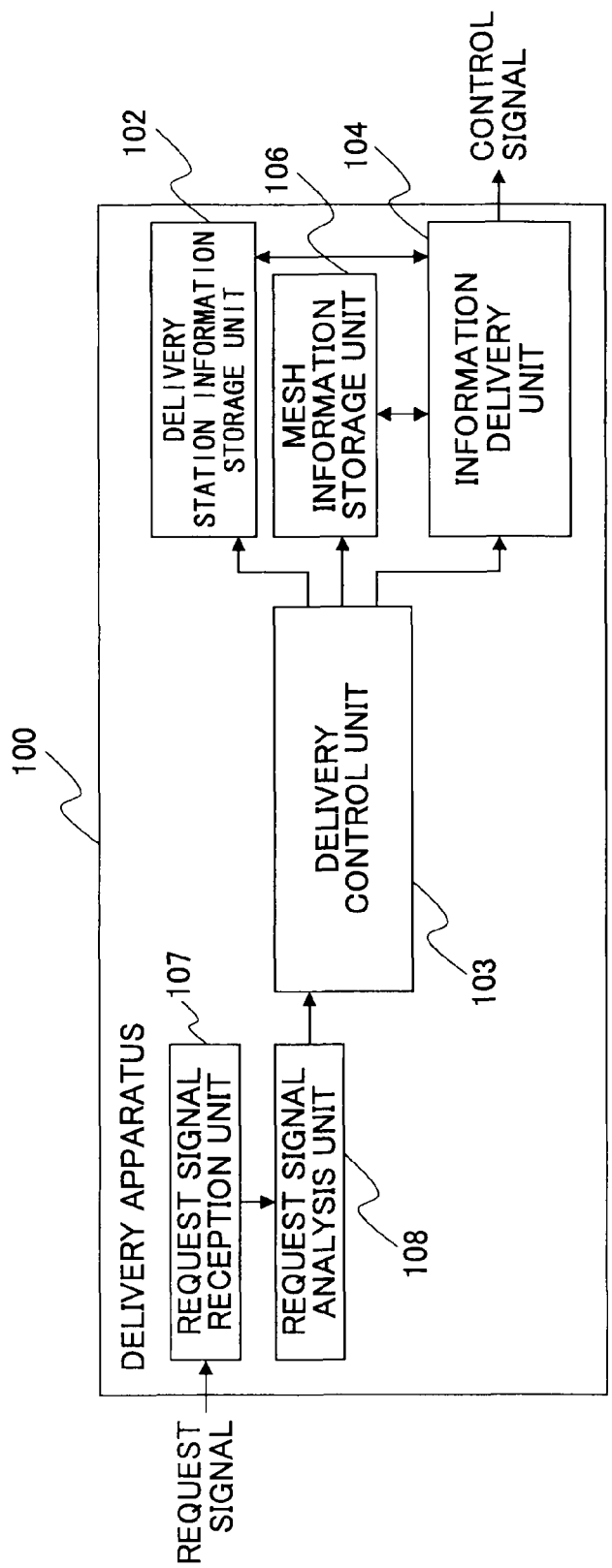
FIG. 16 is a second functional block diagram illustrating a delivery apparatus according to one embodiment.

Another delivery apparatus applied to the above-mentioned radio communication system is described with reference to FIG. 16.

The on-demand type delivery for delivering a common control signal in response to a request from the terminal apparatus 400 is applied to a delivery apparatus 100 according to this embodiment.

The delivery apparatus 100 includes a delivery station information storage unit 102, a delivery control unit 103, an information delivery unit 104, a mesh information storage unit 106, a request signal reception unit 107 and a request signal analysis unit 108.

The request signal reception unit 107 receives a request signal from the terminal apparatus 400. The request signal reception unit 107 supplies bit information in the request signal to the request signal analysis unit 108.

The request signal analysis unit 108 acquires the position information on a terminal apparatus 400 transmitting the request signal or information on a mesh index (Mesh Index) to which the terminal apparatus 400 belongs. Then, the request signal analysis unit 108 supplies the acquired information to the delivery control unit 103. For example, if a radio communication system for use of the terminal apparatus 400 is determined, it is desirable to further indicate information such as frequency band information and a radio scheme used in the radio communication system.

The delivery control unit 103 indicates a mesh index to be delivered to the information delivery unit 104. The information delivery unit 104 requests information corresponding to the mesh index to the delivery station information storage unit 102 and/or the mesh information storage unit 106. When acquiring the system information on the area corresponding to the mesh index, the information delivery unit 104 delivers the system information.

The delivery control unit 103 may use information such as frequency of area information requested for delivery from the request signal analysis unit 108 to modify the operated mesh configuration. If the mesh configuration has to be modified, the delivery control unit 103 transmits information on the modified configuration to the delivery station information storage unit 102 and/or the mesh information storage unit 106. The delivery station information storage unit 102 and/or the mesh information storage unit 106 arranges the delivery control information corresponding to the delivery information type based on the transmitted information.

[Second Terminal Apparatus]

A terminal apparatus according to this embodiment is described with reference to FIG. 17. A terminal apparatus 400 acquires information delivered from the delivery apparatus 100. For example, if the terminal apparatus 400 does not hold system information on the resident area, the terminal apparatus 400 issues a delivery request to the delivery station 100. Then, the terminal apparatus 400 receives a common control signal delivered in accordance with the delivery request and acquires the area information to which the terminal apparatus 400 belongs. The common control signal is received similar to that of the first terminal apparatus 400. For this reason, the request operation of the common control signal is intensively described. In addition to the components of the first terminal apparatus 400 illustrated in conjunction with FIG. 15, the terminal apparatus 400 according to this embodiment further includes a request information transmission unit 413.

The acquired area system information is stored in the mesh information storage unit 407. When the terminal apparatus 400 connects to a radio communication system, the connecting radio system control unit 412 requests the mesh information storage unit 408 to acquire information on connectable radio communication systems. If there is no area information to which the terminal apparatus 400 belongs, the mesh information storage unit 408 requests a common control signal for the resident area to the mesh information acquisition control unit 409. In response to receipt of the request, the mesh information acquisition control unit 409 a delivery station index of the resident delivery station to the delivery station information storage unit 406 and a mesh index of the resident area to the mesh configuration information storage unit 407. In response to receipt of the request, the delivery station information storage unit 406 supplies a delivery station index if it has information on the resident delivery station and a request for the delivery station information otherwise. In response to receipt of the request, the mesh configuration information storage unit 407 supplies the corresponding mesh index if it has the mesh configuration information and a request for the mesh configuration information otherwise. The mesh information acquisition control unit 409 requests the request information transmission unit 413 to transmit a request signal based on the indication from the delivery station information storage unit 406 and the mesh configuration information storage unit 407. If the delivery station information is not stored, a delivery request for the delivery station information is issued. If the mesh configuration information is not stored, a delivery request for the mesh configuration information including a delivery station index of the resident delivery station is issued. If the mesh information is not stored, a delivery request for the mesh information including a delivery station index of the resident delivery station and a mesh index of the resident area is issued. The request information transmission unit 413 transmits a request signal corresponding to the transmitted request signal.

[Third Delivery Apparatus]

A delivery apparatus applied to the above-mentioned radio communication system is described with reference to FIG. 18.

A delivery apparatus 100 according to this embodiment uses the hybrid type delivery where a common control signal is delivered in periodic manner and in a manner triggered by a request from the terminal apparatus 400. In other words, the broadcast type delivery and the on-demand type delivery are applied to the delivery apparatus 100.

The delivery apparatus 100 includes a timer 101, a delivery station information storage unit 102, a delivery control unit 103, an information delivery unit 104, a delivery scheduler 105, a mesh information storage unit 106, a request signal reception unit 107 and a request signal analysis unit 108.

In the hybrid type delivery, in addition to fundamental functions for implementing the broadcast type delivery, the delivery apparatus 100 further includes a request signal reception unit 107 for receiving a request signal from the terminal apparatus 400 and a request signal analysis unit 108. The delivery control unit 103 and the delivery scheduler 105 differ from the above-mentioned functions.

The delivery control unit 103 controls the delivery based on time information from the timer 101 and request signal information from the request signal analysis unit 108. The delivery control unit 103 issues a delivery request to the delivery scheduler 105 based on the time information. Also, the delivery control unit 103 issues a delivery request to the information delivery unit 104 based on the request signal information and indicates information on requested delivery information to the delivery scheduler 105. In response to a request from the terminal apparatus 400, the delivery scheduler 105 updates scheduling operations within the delivery scheduler 105 based on the delivery information.

In the case where an area belonging to the delivery apparatus 100 also belongs to another delivery station, when system information operated by the other delivery station is delivered, the delivery apparatus 100 delivers information indicating that the other delivery station is delivering the system information. Further, the delivery stations operated within the area belonging to the delivery apparatus 100 are subdivided based on radio system frequencies and radio schemes (RATs), and the delivery apparatus 100 delivers the system information and information indicative of delivery means in the other delivery stations. The information indicative of delivery means in the other delivery stations may include a delivery method, a delivery frequency, a delivery radio scheme and configuration information for synchronization with the delivery scheme.

According to such a delivery station, the delivery station has to deliver a reduced amount of information, and delivery efficiency and frequency utilization efficiency can be improved.

In addition, the delivery apparatus has (a) a function of delivering a corresponding control signal in a frequency band near the utilized radio communication system and/or (b) a function of indicating delivery means of other delivery stations, which can simplify a RF circuit in a terminal apparatus and synchronization operations at the acquisition time of the control signal. As a result, it is possible to reduce power consumption in the terminal apparatus. The information indicative of delivery means of other delivery stations may include a delivery method, a delivery frequency, a delivery radio scheme and configuration information for synchronization with the delivery scheme.

For convenience, the present invention has been described in several divided embodiments or items. However, the division is not essential to the present invention, and the subject matter described in the embodiments or items separately may be combined as needed. Specific numeral examples are described in order to facilitate understandings of the present invention, but unless specifically stated otherwise, these numeral examples are simply illustrative, and any other appropriate value may be used.

According to this embodiment, one or more delivery stations can be deployed in all areas covered by a delivery station, which can design layered configuration of delivery stations.

According to this embodiment, one or more delivery stations using different delivery frequencies and/or delivery radio schemes can be deployed in all areas covered by a delivery station. Also in this case, it is possible to design layered configuration of delivery stations.

According to this embodiment, delivery stations for delivering a common control channel can be layered, and accordingly the delivery can be conducted near a radio band where a terminal apparatus is actually communicating. For this reason, it is possible to simplify scanning operations by the terminal apparatus at the frequency band. Since the frequency band for delivering the common control channel is close to the frequency band for communication, it is conceived that reception quality of the control signal may not significantly deviate from reception quality of signals in the communication. For this reason, if a delivery station and a base station apparatus are located at the same position, it is possible to reduce a difference between their coverage areas.

According to this embodiment, the frequency direction is layered, and the control signal is not fixed to one frequency band. As a result, it is possible to realize flexible frequency assignment.

According to this embodiment, layered configuration of delivery cell configuration and frequency/delivery radio scheme configuration is added to a delivery method of the common control channel for delivering radio resource information for use in all radio communication systems. As a result, it is possible to improve the delivery efficiency and the frequency utilization efficiency.

INDUSTRIAL APPLICABILITY

The present invention is not limited to a certain system and may be applied to any appropriate mobile communication system. For example, the present invention may be applied to a W-CDMA system, a HSDPA/HSUPA system, a LTE system, an IMT-Advanced system, a WiMAX, a Wi-Fi system and so on.

The present invention has been described with reference to the specific embodiments, but the embodiments are simply illustrative, and those skilled in the art will understand various variations, modifications, alterations and substitutions. Specific numerical examples have been described in order to facilitate understandings of the present invention. However, these numerical examples are simply illustrative, and any other appropriate value may be used unless specifically stated otherwise. Separation of the embodiments and sections are not essential to the present invention, and two or more of the embodiments and sections may be combined as needed. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions fall in the present invention without deviating from the spirit of the present invention.

This international patent application is based on Japanese Priority Application No. 2008-228988 filed on Sep. 5, 2008, the entire contents of which are hereby incorporated by reference.

LIST OF REFERENCE SYMBOLS 50 ($50_1$-$50_6$): cell
100 ($100_1$-$100_6$): delivery apparatus
101: timer
102: delivery station information storage unit
103: delivery control unit
104: information delivery unit
105: delivery scheduler
106: mesh information storage unit
107: request signal reception unit
108: request signal analysis unit
400: terminal apparatus
401: delivery information reception unit
402: control information determination unit
403: delivery station information processing unit
404: mesh configuration information processing unit
405: mesh information processing unit
406: delivery station information storage unit
407: mesh configuration information storage unit
408: mesh information storage unit
409: mesh information acquisition control unit
410: terminal position information acquisition unit
411: connecting radio system reception unit
412: connecting radio system control unit
413: request information transmission unit

The invention claimed is:

1. A delivery apparatus for delivering to multiple areas wherein one or more radio communication systems are available in each of the areas, comprising:
   a storage unit configured to store system information for each of the areas, the system information being required to connect to the available radio communication systems;
   a detection unit configured to detect a second delivery apparatus for delivering to a portion of the delivery areas of the delivery station; and
   a delivery unit configured to deliver system information for each of the areas as control information, the system information being required to connect to a radio communication system available in the area,
   wherein if the detection unit detects the second delivery apparatus, the delivery unit delivers system information as the control information, the system information in the storage unit excluding a portion of the system information required to connect to a radio communication system available in an area where the second delivery apparatus is responsible for delivering the control information.

2. The delivery apparatus as claimed in claim 1, wherein if the detection unit detects the second delivery apparatus, the delivery unit delivers information indicative of the second delivery apparatus as the control information.

3. The delivery apparatus as claimed in claim 2, wherein the storage unit stores a delivery method of the delivery apparatus, and
   if the detection unit detects the second delivery apparatus, the delivery unit delivers a delivery method of the second delivery apparatus as the control information.

4. The delivery apparatus as claimed in claim 1, wherein
the storage unit stores information on the delivery areas of the delivery apparatus, and
the delivery unit delivers the information on the delivery areas.

5. The delivery apparatus as claimed in claim 1, wherein if the detection unit fails to detect the second delivery apparatus for delivering to a portion of the delivery areas, the delivery unit delivers the system information required to connect to a radio communication system available in an area where the delivery apparatus is responsible for delivering the control information.

6. The delivery apparatus as claimed in claim 1, further comprising:
an indication unit configured to, if the detection unit detects the second delivery apparatus for delivering a portion of the delivery areas of the delivery apparatus and a third delivery apparatus for delivering to all the delivery areas, indicate information on the detected second delivery apparatus to the third delivery apparatus.

7. The delivery apparatus as claimed in claim 1, wherein the delivery unit transmits the control information in a frequency band close to a frequency band for transmitting data.

8. The delivery apparatus as claimed in claim 1, wherein the detection unit detects the second delivery apparatus periodically.

9. A terminal apparatus for receiving control information delivered by a delivery apparatus wherein upon detecting a second delivery apparatus for delivering to a portion of multiple delivery areas of the delivery apparatus, the delivery station delivers system information as control information, the system information excluding a portion of the system information required to connect to a radio communication system available in an area where the second delivery apparatus is responsible for delivering the control information together with information indicative of the second delivery apparatus, comprising:
a reception unit configured to receive the control information from the second delivery apparatus based on the information indicative of the second delivery apparatus in the control information transmitted from the delivery apparatus;
a determination unit configured to determine whether the terminal apparatus belongs to the area where the second delivery apparatus is responsible for delivering the control information based on the control information received at the reception unit from the second delivery apparatus; and
a connection unit configured to, if the determination unit determines that the terminal apparatus belongs to the delivery area of the second delivery apparatus, connect to the second delivery apparatus.

10. The terminal apparatus as claimed in claim 9, wherein the control information transmitted from the delivery apparatus includes a delivery method of the delivery apparatus, and
the reception unit receives the control information from the second delivery apparatus in accordance with the delivery method.

11. The terminal apparatus as claimed in claim 9, wherein if the control information received at the reception unit from the second delivery apparatus includes information on a fourth delivery apparatus for delivering to a portion of multiple delivery areas of the second delivery apparatus, the determination unit determines that the terminal apparatus does not belong to the delivery areas of the second delivery apparatus.

12. The terminal apparatus as claimed in claim 9, wherein if the determination unit determines that the terminal apparatus belongs to the delivery areas of the second delivery apparatus, the connection unit identifies to which of the delivery areas of the second delivery apparatus the terminal apparatus belongs.

13. The terminal apparatus as claimed in claim 12, wherein the connection unit acquires information required to connect to a radio communication system available in the identified area.

14. A system comprising:
a delivery apparatus for delivering to multiple areas; and
a terminal apparatus for receiving information delivered by the delivery apparatus,
wherein one or more radio communication systems are available in each of the areas,
the delivery apparatus comprising:
a storage unit configured to store system information for each of the areas, the system information being required to connect to the available radio communication systems;
a detection unit configured to detect a second delivery apparatus for delivering to a portion of the delivery areas of the delivery station; and
a delivery unit configured to deliver system information for each of the areas as control information, the system information being required to connect to a radio communication system available in the area,
wherein if the detection unit detects the second delivery apparatus, the delivery unit delivers system information as the control information, the system information in the storage unit excluding a portion of the system information required to connect to a radio communication system available in an area where the second delivery apparatus is responsible for delivering the control information, and
the terminal apparatus comprising:
a reception unit configured to receive the control information from the second delivery apparatus based on the information indicative of the second delivery apparatus in the control information transmitted from the delivery apparatus;
a determination unit configured to determine whether the terminal apparatus belongs to the area where the second delivery apparatus is responsible for delivering the control information based on the control information received at the reception unit from the second delivery apparatus; and
a connection unit configured to, if the determination unit determines that the terminal apparatus belongs to the delivery area of the second delivery apparatus, connect to the second delivery apparatus.

15. A method in a system including a delivery apparatus for delivering to multiple areas and a terminal apparatus for receiving information delivered by the delivery apparatus,
wherein one or more radio communication systems are available in each of the areas,
the method comprising: at the delivery apparatus,
detecting a second delivery apparatus for delivering to a portion of the delivery areas of the delivery station; and
delivering system information for each of the areas as control information, the system information being required to connect to a radio communication system available in the area,
wherein if the detecting step comprises detecting the second delivery apparatus, the delivering step comprises delivering system information as the control information, the system information in a storage unit excluding a portion of the system information required to connect to a radio communication system available in an area where the second delivery apparatus is responsible for delivering the control information, and the method further comprising: at the terminal apparatus, receiving the control information from the second delivery apparatus based on the information indicative of the second delivery apparatus in the control information transmitted from the delivery apparatus;

determining whether the terminal apparatus belongs to the area where the second delivery apparatus is responsible for delivering the control information based on the control information received from the second delivery apparatus; and if it is determined that the terminal apparatus belongs to the delivery area of the second delivery apparatus, connecting to the second delivery apparatus.

* * * * *